(12) United States Patent
Quantrille et al.

(10) Patent No.: US 9,688,583 B2
(45) Date of Patent: Jun. 27, 2017

(54) COMPOSITE MATERIALS AND DEVICES COMPRISING SINGLE CRYSTAL SILICON CARBIDE HEATED BY ELECTROMAGNETIC RADIATION

(75) Inventors: Thomas E. Quantrille, Greenville, SC (US); William M. Rogers, Greenville, SC (US)

(73) Assignee: Advanced Composite Materials, LLC, Greer, SC (US)

( * ) Notice: Subject to any disclaimer, the term of this patent is extended or adjusted under 35 U.S.C. 154(b) by 2092 days.

(21) Appl. No.: 11/846,960

(22) Filed: Aug. 29, 2007

(65) Prior Publication Data

US 2007/0295716 A1 Dec. 27, 2007

Related U.S. Application Data

(63) Continuation-in-part of application No. 11/392,612, filed on Mar. 30, 2006, now abandoned.

(51) Int. Cl.

| | |
|---|---|
| H05B 6/80 | (2006.01) |
| H05B 6/64 | (2006.01) |
| C04B 35/80 | (2006.01) |
| C04B 35/117 | (2006.01) |
| C04B 35/622 | (2006.01) |
| C04B 35/645 | (2006.01) |
| A23L 5/10 | (2016.01) |

(52) U.S. Cl.
CPC .............. *C04B 35/803* (2013.01); *A23L 5/15* (2016.08); *C04B 35/117* (2013.01); *C04B 35/62236* (2013.01); *C04B 35/645* (2013.01); *C04B 2235/3826* (2013.01); *C04B 2235/526* (2013.01); *C04B 2235/5244* (2013.01); *C04B 2235/5264* (2013.01); *C04B 2235/5276* (2013.01); *C04B 2235/5445* (2013.01); *C04B 2235/6021* (2013.01); *Y10T 428/2918* (2015.01)

(58) Field of Classification Search
CPC ... A23L 1/0128; C04B 35/117; C04B 35/803; C04B 35/645
USPC ........................ 219/730, 759, 634, 678, 649; 99/DIG. 99; 426/107, 234, 241, 243; 75/230
See application file for complete search history.

(56) References Cited

U.S. PATENT DOCUMENTS

| | | |
|---|---|---|
| 3,269,802 A | 8/1966 | Wainer et al. |
| 3,403,008 A | 9/1968 | Hamling |

(Continued)

FOREIGN PATENT DOCUMENTS

| | | |
|---|---|---|
| CA | 2454179 | 1/2003 |
| EP | 0 339 904 A1 | 11/1989 |

(Continued)

OTHER PUBLICATIONS

"*Preparation of Silicon Carbide Fiber From Activate Carbon Fiber and Gaseous Silicon Monoxide*", K. Okada, et al., Ceramic Engineering & Science Proceedings, Jul.-Aug. 1994, pp. 45-54.

(Continued)

*Primary Examiner* — Quang Van
(74) *Attorney, Agent, or Firm* — Banner & Witcoff, Ltd.

(57) ABSTRACT

A composite material that increases in temperature upon exposure to electromagnetic radiation includes single crystal silicon carbide whiskers and fibrils in a matrix material. Also disclosed are heat-generating objects that include the composite material, and a method of generating heat.

11 Claims, 17 Drawing Sheets

(56) References Cited

U.S. PATENT DOCUMENTS

| | | | |
|---|---|---|---|
| 3,640,693 A | 2/1972 | Galasso et al. |
| 3,671,275 A | 6/1972 | Gates, Jr. et al. |
| 3,754,076 A | 8/1973 | Cutler |
| 3,773,899 A | 11/1973 | Lewis |
| 4,100,233 A | 7/1978 | Yajima et al. |
| 4,127,659 A | 11/1978 | DeBolt et al. |
| 4,283,375 A | 8/1981 | Horne, Jr. et al. |
| 4,284,612 A | 8/1981 | Horne, Jr. et al. |
| 4,481,179 A | 11/1984 | Wei |
| 4,485,179 A | 11/1984 | Brennan et al. |
| 4,492,681 A | 1/1985 | Endou et al. |
| 4,543,345 A | 9/1985 | Wei |
| 4,663,105 A | 5/1987 | Sakai et al. |
| 4,743,919 A | 5/1988 | Chang et al. |
| 4,820,664 A | 4/1989 | Fain |
| 4,849,196 A | 7/1989 | Yamada et al. |
| 4,855,122 A | 8/1989 | Kitamura et al. |
| 4,864,186 A | 9/1989 | Milewski et al. |
| 4,873,069 A | 10/1989 | Weaver et al. |
| 4,888,247 A | 12/1989 | Zweben et al. |
| 4,904,836 A | 2/1990 | Turpin et al. |
| 4,915,924 A | 4/1990 | Nadkarni et al. |
| 4,931,608 A | 6/1990 | Bills |
| 4,938,673 A | 7/1990 | Adrian |
| 4,956,316 A | 9/1990 | Sawyer |
| 4,962,000 A | 10/1990 | Emslander et al. |
| 4,975,392 A | 12/1990 | Yamada et al. |
| 5,021,230 A | 6/1991 | Krstic |
| 5,039,501 A | 8/1991 | Kibbel et al. |
| 5,071,600 A | 12/1991 | Deleeuw et al. |
| 5,087,272 A | 2/1992 | Nixdorf |
| 5,132,178 A | 7/1992 | Chyung et al. |
| 5,189,273 A | 2/1993 | Inukai et al. |
| 5,230,848 A | 7/1993 | Wallace et al. |
| 5,231,269 A | 7/1993 | Oku et al. |
| 5,268,336 A | 12/1993 | Deleeuw et al. |
| 5,279,780 A | 1/1994 | Lipowitz et al. |
| 5,280,150 A | 1/1994 | Arai et al. |
| 5,310,598 A | 5/1994 | Yoshinaka et al. |
| 5,340,417 A | 8/1994 | Weimer et al. |
| 5,344,709 A | 9/1994 | Tokutomi et al. |
| 5,518,678 A | 5/1996 | Miyamoto et al. |
| 5,595,673 A | 1/1997 | Eskström et al. |
| 5,618,510 A | 4/1997 | Okada et al. |
| 5,643,514 A | 7/1997 | Chwastiak et al. |
| 5,651,250 A | 7/1997 | Kawamura |
| 5,676,918 A | 10/1997 | Okada et al. |
| 5,682,740 A | 11/1997 | Kawamura |
| 5,698,143 A | 12/1997 | Tani et al. |
| 5,720,933 A | 2/1998 | Srinivasan |
| 5,809,777 A | 9/1998 | Kawamura |
| 5,833,795 A | 11/1998 | Smith et al. |
| 5,843,287 A | 12/1998 | Wicks et al. |
| 5,906,799 A | 5/1999 | Burgie et al. |
| 5,914,187 A | 6/1999 | Naruse et al. |
| 5,922,300 A | 7/1999 | Nakajima et al. |
| 5,928,978 A | 7/1999 | Barnard et al. |
| 5,945,362 A | 8/1999 | Ishikawa et al. |
| 6,022,515 A | 2/2000 | Stole et al. |
| 6,024,822 A | 2/2000 | Alper et al. |
| 6,103,812 A | 8/2000 | Wei et al. |
| 6,143,139 A | 11/2000 | Wicks et al. |
| 6,203,904 B1 | 3/2001 | Sacks |
| 6,211,501 B1 | 4/2001 | McCarthy et al. |
| 6,229,131 B1 | 5/2001 | Koochaki |
| 6,294,463 B1 | 9/2001 | Tseng |
| 6,312,548 B1 | 11/2001 | Fathi et al. |
| 6,316,051 B2 | 11/2001 | Okada |
| 6,328,779 B1 * | 12/2001 | He et al. ............... 55/523 |
| 6,333,393 B1 | 12/2001 | Harada |
| 6,401,962 B1 | 6/2002 | Littlejohn et al. |
| 6,420,476 B1 | 7/2002 | Yamada et al. |
| 6,433,037 B1 | 8/2002 | Guzauskas |
| 6,440,509 B1 | 8/2002 | Littlejohn et al. |
| 6,444,308 B1 | 9/2002 | Ferrante |
| 6,459,075 B1 | 10/2002 | McCarthy et al. |
| 6,469,091 B2 | 10/2002 | Murakami et al. |
| 6,474,497 B1 | 11/2002 | Littlejohn et al. |
| 6,518,336 B1 | 2/2003 | Yabuhara et al. |
| 6,520,870 B2 | 2/2003 | Tzivanis et al. |
| 6,528,145 B1 | 3/2003 | Berger et al. |
| 6,571,980 B1 | 6/2003 | Littlejohn et al. |
| 6,608,292 B1 | 8/2003 | Barnes |
| 6,656,602 B1 | 12/2003 | Ishikawa et al. |
| 6,669,751 B1 | 12/2003 | Ohno et al. |
| 6,670,592 B2 | 12/2003 | McCarthy et al. |
| 6,677,044 B2 | 1/2004 | Araki et al. |
| 6,689,191 B2 | 2/2004 | Dunmead et al. |
| 6,726,994 B1 | 4/2004 | Araki et al. |
| 6,733,852 B2 | 5/2004 | Littlejohn et al. |
| 6,767,122 B2 | 7/2004 | Honguh et al. |
| 6,767,523 B2 | 7/2004 | Nixdorf |
| 6,841,273 B2 | 1/2005 | Horiuchi et al. |
| 7,154,073 B2 | 12/2006 | Iwai et al. |
| 7,176,426 B2 | 2/2007 | Ramirez |
| 2001/0008651 A1 | 7/2001 | Okada |
| 2001/0015354 A1 | 8/2001 | McCarthy et al. |
| 2002/069756 A1 | 6/2002 | Mako et al. |
| 2002/0078793 A1 * | 6/2002 | Holl et al. ............... 75/230 |
| 2003/0017096 A1 | 1/2003 | Nixdork |
| 2003/0072704 A1 | 4/2003 | Konno et al. |
| 2003/0218010 A1 | 11/2003 | Jang et al. |
| 2005/0019567 A1 * | 1/2005 | Nixdorf ............... 428/367 |

FOREIGN PATENT DOCUMENTS

| | | |
|---|---|---|
| EP | 0 383 344 A2 | 8/1990 |
| EP | 0 432 794 A1 | 6/1991 |
| EP | 0 394 463 B1 | 6/1995 |
| EP | 0 570512 B1 | 1/1996 |
| EP | 77-1773 A | 5/1997 |
| EP | 0 926 273 | 6/1999 |
| EP | 1 529 825 A2 | 5/2005 |
| EP | 1 406 836 | 9/2007 |
| EP | 0432794 A1 | 10/2008 |
| FR | 2497434 A | 7/1982 |
| GB | 998089 | 7/1965 |
| GB | 2 147 891 A | 5/1985 |
| GB | 2 315 003 A | 6/1997 |
| JP | 56-145180 | 11/1981 |
| JP | 57-209813 | 12/1982 |
| JP | 58-20799 | 2/1983 |
| JP | 60-46908 | 3/1985 |
| JP | 61-17499 | 1/1986 |
| JP | 63-100055 A | 5/1988 |
| JP | H1-95228 | 4/1989 |
| JP | 1313369 | 12/1989 |
| JP | HEI 2-216789 | 8/1990 |
| JP | Hei 2-217719 | 8/1990 |
| JP | 03-104926 | 5/1991 |
| JP | 03-119179 | 5/1991 |
| JP | HEI 3-215226 | 9/1991 |
| JP | 04-245924 | 9/1992 |
| JP | 06-081219 | 3/1994 |
| JP | 6068970 | 3/1994 |
| JP | H6-124767 | 5/1994 |
| JP | 06-173117 | 6/1994 |
| JP | 06-173118 | 6/1994 |
| JP | H6-248935 | 9/1994 |
| JP | 70-19476 A | 1/1995 |
| JP | 70-42533 A | 2/1995 |
| JP | 71-27434 A | 5/1995 |
| JP | 72-15777 A | 8/1995 |
| JP | 72-91756 A | 11/1995 |
| JP | 81-88926 A | 7/1996 |
| JP | 11061573 A | 3/1999 |
| JP | 2002-126534 | 5/2002 |
| JP | 1374416 A | 10/2002 |
| JP | 2006-35056 | 2/2006 |
| WO | 1991-08992 | 6/1991 |
| WO | WO 98/12040 | 3/1998 |
| WO | 2000-05312 A1 | 2/2000 |
| WO | 2003-042616 A1 | 5/2003 |
| WO | WO 2005030385 | 4/2005 |

(56) References Cited

FOREIGN PATENT DOCUMENTS

| WO | 2006/026345 A2 | 3/2006 |
|---|---|---|
| WO | WO 2006068402 | 6/2006 |
| WO | 2007-078788 A2 | 7/2007 |

OTHER PUBLICATIONS

A. Idesaki, et al, "*Synthesis of SiC-Based Fibers Derived From Hybrid Polymer of Polycarbosilane and Polyvinylsilane*", Key Engineering Materials vols. 159-160 (1999), pp. 107-112.
International Application No. PCT/US2007/07950—International Search Report and the Written Opinion of the International Searching Authority—Dated Nov. 17, 2008. Note: the ISR lists U.S. Pat. No. 6,682,740 (Kawamura) Nov. 4, 1997; however, U.S. Pat. No. 6,682,740 is in the name of Anna Erdei and Israel Pecht was issued on Jan. 27, 2004 and pertain to a subject matter unrelated to the invention. Applicants have not been able to determine the intended citation.

M. Gupta and W.L.E. Wong: Enhancing overall mechanical performance of metallic materials using two-directional microwave assisted rapid sintering, Scripta Materialia, Elsevier, Amsterdam, The Netherlands, vol. 52, No. 6, Mar. 1, 2005, pp. 479-483.
Supplementary European Search Report, Corresponding European Patent Application No. EP 07 75 4466.
Korean Office Action, Related Korean Patent Application No. 10-2003-0046304, dated Mar. 16, 2010.
Notice of Reasons for Rejection mailed Apr. 2, 2012 for corresponding Japanese Patent Application No. 2009-503036.
Appeal Decision mailed Jun. 17, 2013 for related Japanese Patent Application No. 2009-503036.
Notice of Completion of Pretrial Examination and Pre-Appeal Examination Report issued Jan. 9, 2013 for corresponding Japanese Patent Application No. 2009-503036.
Notice of Reasons for Rejection in corresponding Japanese Patent Application No. 2012-232004 mailed Nov. 14, 2013.

\* cited by examiner

 
 
 
 
 
 
 
 
 
 
FIG. 10B             FIG. 10C

 
 
 
 
 
FIG. 11B     FIG. 11C
 
 
 
 

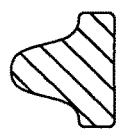  
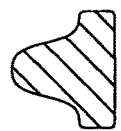 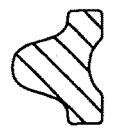 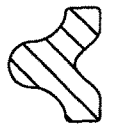
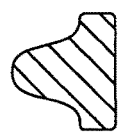 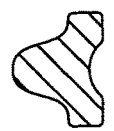 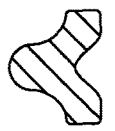
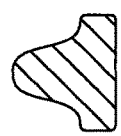  
FIG. 12B  FIG. 12C  FIG. 12D
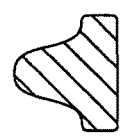  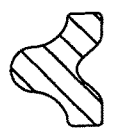
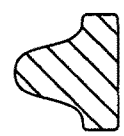  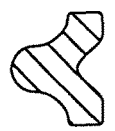
 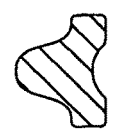 
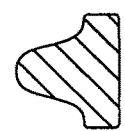 

COMPOSITE MATERIALS AND DEVICES COMPRISING SINGLE CRYSTAL SILICON CARBIDE HEATED BY ELECTROMAGNETIC RADIATION

CROSS-REFERENCE TO RELATED APPLICATIONS

This present application is a continuation-in-part of U.S. application Ser. No. 11/392,612, filed on Mar. 30, 2006 and the contents therein are incorporated by reference herein.

FIELD OF THE INVENTION

The invention relates to composite materials that quickly and efficiently increase temperature by absorption of electromagnetic radiation. The invention also relates to devices comprising the composite materials, and to a method of heating using these devices.

BACKGROUND OF THE INVENTION

Many materials are known to not absorb microwave energy or other electromagnetic radiation. Such materials may be reflective or transparent to the electromagnetic radiation without being affected thereby. Therefore, these materials do not heat when exposed to microwave or radiowave fields.

Many materials are known to absorb electromagnetic radiation and therefore will heat. Heating with microwave energy is but one example of this phenomenon, and many compositions that heat upon absorption of microwave energy are known. For example, water, fats, and certain food products absorb microwave energy and are heated thereby. Similarly, inorganic compounds such as carborundum powder, ferrites, zinc oxide, silicon carbide, and even carbon particles are known to heat upon absorption of microwave energy. Such compounds can be used to impart heat to their surroundings.

However, not every form of such materials can be used in this way. For example, metal powder can be used to absorb microwave energy, and is used in combination with other compositions to form heatable objects. However, metal is highly conductive, and this high conductivity can lead to arcing or sparking. For example, a large mass of solid metal typically cannot be placed in a microwave oven without causing damage from arcing and sparks caused thereby.

More than 200 crystal structures and forms of silicon carbide have been identified. Some forms of silicon carbide are known to heat upon absorption of microwave energy, and can be used in various forms in manufacture of objects that heat by absorption of electromagnetic radiation. Silicon carbide thus used is polycrystalline particulate. Silicon carbide is used to make objects that are heated by absorption of microwave energy. Such objects are used, for example, as reversible water absorbents, i.e., objects that absorb water that then are dried and rejuvenated by heating in a microwave oven to drive off the absorbed water. Other forms of silicon carbide are known to be minimally absorptive of microwave radiation.

Absorptive forms of silicon carbide can be used as a part of products used for heating foods. In particular, silicon carbide is used for manufacture of heating objects used to form a browned surface on foods heated in a microwave oven, because microwave energy alone often does not brown foods. Also, silicon carbide whiskers are described as mineral filler, providing rigidity and strength, for resins used to make containers used in microwave cooking. When used as a mineral filler, silicon carbide usually is in a form that is minimally absorptive of microwave radiation.

Silicon carbide also is used in selected steps of processes for manufacture of ceramic and metallic objects. For example, organic binder has been removed from an object made from silicon carbide powder by heating in microwave energy. Also, silicon carbide powder is known as a microwave-absorbent material suitable for heating ceramic pellets buried therein to degrease the pellets, or to remove binder and sinter the pellets. Graphite, silicon carbide, and other di-electric materials are known to be suitable material to be embedded in a polymeric ceramic precursor system containing a metal element that is, upon exposure to high-frequency (greater than 20 GHz) microwave energy, cured by heat produced by the di-electric to form a ceramic/metal composite. However, these systems typically have slow heating rates, thereby negating the benefits associated with microwave heating.

It is known that exposing silicon carbide, ceramic fibers, and microwave absorptive materials to microwave energy may lead to undesirable arcing and sparking. Metals, including metal powders, also lead to arcing because metals are conductive. Therefore, methods of reducing such sparking have been developed. In one such method, silicon carbide is deposited in and around the ceramic fibers by chemical vapor deposition. Such ceramic/silicon carbide composites heat when exposed to microwave energy, but the silicon carbide formed by CVD suppresses sparking.

Silicon carbide and other carbon-containing materials are mixed into a ceramic-containing powder mixture to serve as an aid to the heating of a ceramic powder thick-walled object during sintering. The powder contains materials, such as clays and kaolins, to increase susceptibility to microwave energy, and the object is autoclaved before microwaving to put the ceramic powders into a form that absorbs microwave energy more efficiently than the unchanged ceramic. The object then is sintered by exposure to microwave energy. However, if the object is not autoclaved, the heating rate is unacceptably slow.

There exist limitations on the use of silicon carbide in heat-generating objects. The heating efficiency of even the most absorptive forms of silicon carbide typically is low. Indeed, the heating efficiency of typical silicon carbide particulate is so low that such particulate is used to increase the strength and cut-resistance of microwave-heatable food containers that remain cool to the touch. It also has been disclosed that addition of silicon carbide to plastics of various types yields a product that imparts objectionable odors during use. Thus, use of such silicon carbide forms requires ameliorating measures and additives to control these odors.

Typically, the highest temperature achieved by irradiation of silicon carbide with microwave energy is relatively low, about 300° C., often because the concentration of silicon carbide must be kept low to preclude degrading the properties and characteristics of the matrix material. Higher temperatures can be achieved in combination with some materials such as solid blocks comprising silicon carbide bonded with another material. Temperatures of 600-800° C. are achieved within 3-4 minutes of exposure to microwave energy at 600 W with solid blocks of silicon nitride-bonded silicon carbide. Such material has a density lower than solid or single crystal silicon carbide. Such material is used for ashing other compounds.

There remains a need for improved radiant heating devices. Devices for food heating are limited, as are devices for other purposes. Known devices are inefficient and slow to achieve working temperatures. The slow heating rates negate the benefits, and especially the expected quick heating, of microwave and radiant heating methods. Some devices are limited by the temperatures that can be achieved. Others cause arcing when exposed to microwave energy, thus risking damage to the microwave oven or electromagnetic radiation source. The quantity of silicon carbide powder, carbon powder and particles, and other microwave-absorbing material required to achieve a desired heat generation often must be so great as to degrade the properties and characteristics of the matrix to which the material is added. Thus, there remains a need for devices that heat quickly, efficiently, and to a high temperature, without arcing and sparking, when exposed to electromagnetic radiation, especially microwave energy. Also, there exists a need for objects that have a wider range of uses than now are available.

BRIEF SUMMARY OF THE INVENTION

The invention is directed to composite materials that heat quickly and efficiently to a high temperature by absorption of electromagnetic radiation, and particularly by absorption of microwave energy. In addition, composite materials of the invention do not arc or cause sparking. The composite materials comprise a unique form of silicon carbide. This unique form is single-crystal silicon carbide whisker or fibril that is strongly heated by electromagnetic radiation. The invention also is directed to objects made with the composite materials, and to a method of heating using the materials of the invention.

Composite materials of the invention can be shaped to form containers, such as crucibles, cooking, and serving vessels that are suitable for heating other compositions contained therein or thereon by absorbing electromagnetic radiation. Composite materials of the invention also can be formed into shapes and used as a source of heat, such as for melting metals. Materials of the invention also can be microwave-curable or microwave-heatable reinforced polymers and adhesives.

BRIEF DESCRIPTION OF THE DRAWINGS

FIGS. 10B and 10C are cross-sections of heating element 1 of FIG. 10A.

FIGS. 11B and 11C are alternate cross-sections of heating element 1 of FIG. 1A.

FIGS. 12B, 12C and 12D are alternate cross-sections of heating element 1 of FIG. 12A.

DETAILED DESCRIPTION OF THE INVENTION

Figure 1:
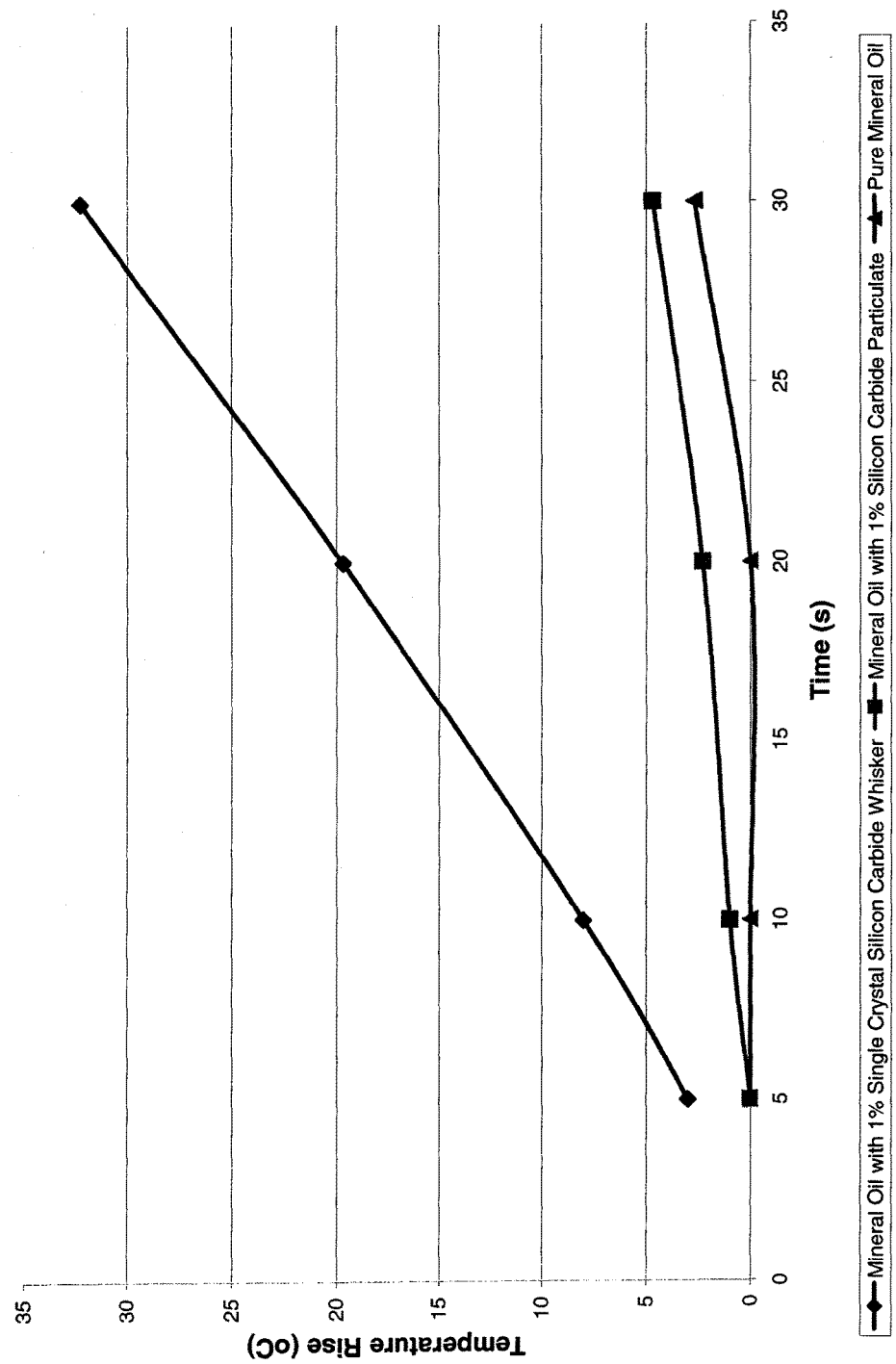
FIG. 1 depicts a comparison of microwave heating of mineral oil-based materials.

The invention is directed to composite materials that heat quickly and efficiently to a high temperature by absorption of electromagnetic radiation, particularly of microwave energy. The inventors have synthesized single crystal silicon carbide whiskers and fibrils and have discovered that these single crystal silicon carbide whiskers and fibrils are especially suited to converting electromagnetic radiation, particularly microwave energy, to heat. Thus, objects made with the composite materials heat quickly and efficiently, and to a high temperature if desired. Thus, such objects can be used in manners not suitable for known silicon carbide-containing microwave-heatable devices, such as to melt metal. In the alternative, objects that do not require higher temperatures can be made at lower cost and used at lower cost. Further, single crystal silicon carbide whiskers and fibrils provide additional strength as compared with objects containing particulate silicon carbide, and objects containing the single crystal silicon carbide whiskers or fibrils are more easily manufactured than are objects made from known materials. The quantity of single crystal silicon carbide whiskers or fibrils is sufficiently low so as not to degrade the properties and characteristics of the matrix material.

Composite materials of the invention comprise single crystal silicon carbide whiskers or fibrils in a matrix or binder. The skilled practitioner recognizes that conversion of electromagnetic radiation to heat within an absorptive material is governed by the following equation:

$$P = 2\pi f E^2 \in \tan \delta \quad [1]$$

where:
P=power (watts/m$^3$)
f=frequency (Hz)
E=voltage gradient (V/m)=
∈=dielectric permittivity
tan δ=dielectric loss tangent The inventors have discovered that, surprisingly, when composite materials are formed with the single crystal silicon carbide whiskers or fibrils of the invention, the dielectric loss tangent value of the composite rises to very high levels. This effect results in these composites having exceptionally rapid heating rates.

A composition having a high loss tangent value is said to be a 'lossy' composition. That is, such a composition generates a large loss (dissipating) current, and so heats well. Compositions with low dielectric loss do not heat well when exposed to electromagnetic radiation. Thus, most ceramics, polymers, inks, adhesives, dry wood and cellulosic products (including paper and cardboard), and minerals generally exhibit low dielectric loss (i.e., are not lossy) and therefore do not convert electromagnetic radiation efficiently into heat.

The inventors have discovered that single crystal silicon carbide whiskers and fibrils have a remarkable ability to absorb and convert electromagnetic radiation into heat. Therefore, single crystal silicon carbide whiskers and fibrils can be used at lower loading levels, i.e., at lower concentration, compared with polycrystalline silicon carbide particles, to achieve a desired level of heat generation. In particular, the ability to use a lesser amount of single crystal silicon carbide whiskers or fibrils than polycrystalline silicon carbide particles attains the advantage that the properties and characteristics of the matrix material are not degraded. Further, single crystal silicon carbide whiskers and fibrils do not arc or cause sparks.

Although the inventors do not wish to be bound by theory, it is believed that single crystal silicon carbide whiskers and fibrils have a particularly high dielectric loss tangent because they have favorable morphology. Also, dopants in single crystal silicon carbide whiskers and fibrils provide additional heat release per unit energy absorbed. Dopants operate by increasing the value of the dielectric loss tangent. Dopants can be placed inside the silicon carbide lattice itself, or within the composite matrix surrounding the silicon carbide.

There are two types of dopants: "p-" type and "n-" type. A p-type dopant increases the number of free (in this case positive) charge carriers. When a p-type doping material is added, it takes away (accepts) weakly-bound electrons in the silicon carbide lattice. This creates a lost electron "hole." Having more holes increases the conductivity of the material, which in turn increases dielectric loss tangent value.

Conversely, an n-type dopant gives away (donates) weakly-bound electrons to the silicon carbide lattice. This type of doping agent is also known as donor material since it gives away some of its electrons. The purpose of n-type doping is to produce an abundance of mobile or "carrier" electrons in the material. A typical silicon carbide structure is covalently bonded with four electrons. An n-type dopant introduces a fifth electron into the structure. This fifth electron is mobile, and the electron mobility increases the conductivity, which in turn increases the dielectric loss tangent value.

The inventors have found that n-type dopants are particularly useful for generating higher dielectric loss tangent values. In particular, dissolved nitrogen is a very effective n-type dopant to increase the dielectric loss tangent of the silicon carbide lattice. The concentration of dopant in single crystal silicon carbide whiskers and fibrils used to form composite material of the invention ranges up to about 2 wt percent, preferably up to about 1.5 wt percent, and more preferably up to about 1.0 wt percent. Any amount of dopant will increase the lossiness of the single crystal silicon carbide whiskers and fibrils. For example, nitrogen present at a concentration of between about 0.2 and about 0.5 wt percent increases the lossiness of single crystal silicon carbide whiskers and fibrils. With the guidance provided herein, the skilled practitioner will be able to identify suitable dopants and determine concentrations of dopants that provide a desired increase in lossiness.

Single crystal silicon carbide used in the invention comprises two form-factors, whiskers and fibrils. Whiskers and fibrils can be used separately or in combination of any proportions. The whiskers are generally smaller than the fibrils, but the size ranges may overlap. The whiskers have a diameter of between about 0.2 and about 10 microns, preferably between about 0.3 and about 3 microns, more preferably between about 0.4 and about 2 microns, and most preferably between about 0.5 and about 1.5 microns. The aspect ratio, i.e., the ratio of length to diameter (L/D), of such whiskers is between about 10 and about 100, preferably between about 10 and 50, and more preferably between about 12 and about 20. One such commercially available single crystal silicon carbide whisker product is available from Advanced Composite Materials Corporation of Greer, S.C., under the trade name Silar® brand silicon carbide whiskers. This product comprises single crystal silicon carbide whiskers having an average diameter of 0.6 microns and an average length of 9 microns. Single crystal silicon carbide whiskers can be made in accordance with the method disclosed in Cutler, U.S. Pat. No. 3,754,076, the entirety of which is hereby incorporated by reference. Silicon carbide fibrils suitably used in this invention typically have a diameter of about 4 to about 20 microns, preferably between about 4 and about 16 microns, and more preferably between about 5 and about 15 microns. These fibrils have a length at least about 50 microns, and typically between about 60 and about 1000 microns. Such fibrils can be made in accordance with the methods disclosed in Angier, United States Patent Application Publication 2004/0009112, and Angier, U.S. application Ser. No. 11/186,941, the entireties of which are hereby incorporated by reference.

Thus, the morphology of the single crystal silicon carbide whiskers and fibrils affects the dielectric loss tangent value. The morphology of the single crystal silicon carbide whiskers and fibrils is particularly well-suited to provide radiant heating when exposed to electromagnetic radiation, and is superior to the morphology of bulk or granular forms of polycrystalline silicon carbide for this purpose.

Silicon carbide whiskers are single crystal materials. Because they are not polycrystalline, there are essentially no voids, defects, or disruptions in the crystal lattice that can limit conductivity and thereby reduce the ability of the whiskers to heat.

Silicon carbide fibrils may be, but typically are not, single crystals. Rather, these fibrils are likely to be made up of numerous single crystals of silicon carbide. Although the inventors do not wish to be bound by theory, silicon carbide fibrils are believed to benefit from the same effect as single crystal silicon carbide whiskers, because there are believed to be single-crystal segments within these fibrils that are advantageously conductive. Therefore, unlike polycrystalline silicon carbide of comparable dimension, there are few crystal boundaries that may lead to voids, defects, and disruptions in the crystal lattice.

Although the inventors do not wish to be bound by theory, silicon carbide whiskers with a diameter of 0.5 microns and an aspect ratio of at least 10:1 (length greater than 5 microns) allow for electron flow over a larger distance than polycrystalline silicon carbide particulates. This electron flow over a longer span creates line loss, and increases the dielectric loss tangent. Likewise, silicon carbide fibrils, which more preferably have a diameter from 5-15 microns and length of at least 50 microns, can have large line loss. As an electrical potential is applied to one side of the whisker or fibril, a dopant's donor electron will flow. Since the whisker or fibril is or acts like a long single crystal, the free electron flow length increases, which in turn increases the line loss and the dielectric loss tangent value.

Thus, single crystal silicon carbide whiskers and fibrils comprises (1) single crystal whiskers and (2) fibrils having numerous single crystal segments. Although fibrils may be slightly less efficient at conversion of microwave energy to heat than single crystal whiskers, fibrils have an efficiency essentially the same as the single crystal silicon carbide whiskers, and have properties and characteristics much more like single crystal silicon carbide whiskers than typical polycrystalline silicon carbide.

The matrix material is selected to provide a composite material of the invention suitable for the intended use. For example, a composite material of the invention used to melt metal will typically utilize a matrix material different from a matrix material used to form a composite material of the invention used to heat food.

Matrix material for composite materials of the invention should resist deformation caused by the increase in temperature expected when the composite object is heated. Absorption of microwave energy by the matrix material may reduce the quantity of microwave energy available to the single crystal silicon carbide whiskers and fibrils. Preferably, therefore, the matrix material is transparent to microwave energy so as to make essentially all of the microwave energy available to heat the single crystal silicon carbide whiskers and fibrils.

Typically, matrix material suitably used in composite material of the invention preferably has a high dielectric permittivity to the electromagnetic radiation used, and is selected from polymers, ceramics, organic liquids and solids, and any other composition that is transparent to or heat only slowly upon exposure to electromagnetic radiation. The electromagnetic radiation can have a frequency between about 5 kHz (radiowave frequencies) and about 150 GHz (microwave frequencies). More typically, however microwave frequencies in the range of from about 500 MHz to about 23 GHz, and more typically between about 750 MHz and about 3 GHz. Typically, microwave ovens use a frequency of about 915 MHz (industrial ovens in the United States) and about 2.45 GHz (consumer ovens in the United States). Other frequencies may be used as well, such as 896 MHz, which is less common.

Preferably, composite objects of the invention do not melt, warp, or otherwise become objectionably deformed when heated. For example, a food service container preferably retains its shape well, as distortions, bulging, bending, melting, and similar deformations likely would be perceived as objectionable by consumers. However, users likely would not object to such minor deformations in an object intended for industrial use as a heat source. Also, the matrix material must be suitable for the use intended. For example, food service equipment must be manufactured with food-safe material. With the guidance provided herein, the skilled practitioner will be able to identify and select suitable matrix material.

Thus, the matrix material typically is selected from microwave-transparent compounds, and is selected based on the properties and characteristics required for the use intended. Matrix material typically is selected from organic and inorganic solids and liquids, ceramics, and polymers. Polymers can be thermoplastic or thermoset, although there exists the issue of melting a thermoplastic polymer. Also, hot-melt adhesives and polymers that cure with heat also are suitable matrix material for single crystal silicon carbide whiskers and fibrils to form composite materials of the invention.

In addition, thermosets can be 'activated' above their glass transition temperatures by way of microwave heating. When activated above its glass transition temperature, a thermoset changes from a hard, glassy polymer into a soft, rubbery elastomer. Therefore, microwave 'activation' can be used to raise the temperature of a thermoset polymer and thereby move the polymer from the glassy state through the glass transition temperature and into the rubbery state.

For polymers in general and in food service, for example, matrix material includes acrylics, polyetherimide, polyamide, polyphenylene ether, aliphatic polyketone, polyetherether ketones, polysulfones, aromatic polyesters, silicone resins, epoxy resins, polyolefins, such as isotactic polypropylene, polypropylene- and polyethylene-based copolymers, and, for particularly high temperature food-related uses, polyphenylenesulfides. Blends of compatable polymers and polymer precursors cured in place also are suitable for use in food service.

Fluids and pastes also are suitable matrix material. Mineral oil (paraffin oil) is suitable as a matrix material. Mineral oil with single crystal silicon carbide whiskers and fibrils added thereto and placed into a suitable flexible container results in a mass that comports to another shape. Thus, this configuration forms a heating pad convenient for use on the human body, for example. Other fluids, such as oils, alcohols, and other organic liquids, also can serve as matrix material.

Other uses call for a durable composite material of the invention. Such materials include, for example, compounds and mixtures of alumina, zirconia, silica, silicon and boron nitrides, titanium compounds, and other ceramics. Similarly, ceramic papers, such as filter papers, can be made with single crystal silicon carbide whiskers and fibrils in accordance with this invention. Other suitable matrix materials include zeolites and molecular sieves.

Other matrix materials include silicone rubber and other microwave-transparent rubbers. Films formed of polyolefin, polyester, polyimide, fluorocarbon, silicone, nylon, and polyether sulfone can be used to affix a coating comprising single crystal silicon carbide whiskers and fibrils to paper, cardboard, and the like. Single crystal silicon carbide whiskers and fibrils in a carrier serves as a composite material of the invention that can be applied to a substrate to form a coating of single crystal silicon carbide whiskers and fibrils in a retentive base.

Composite materials of the invention also can be in the form of a coating or paint comprising single crystal silicon carbide whiskers and fibrils that sets or forms a desired coating on a substrate. For example, single crystals of silicon carbide can be dispersed with polyphenylene sulfide (PPS) in pentachloronitrobenzene or p-dichlorobenzene at elevated pressure and temperature above about 200° C. This dispersion can be coated onto glass or another microwave-transparent substrate to make an object with a microwave active coating.

Composite materials of the invention include hot-melt adhesives comprising microwave absorbent single crystal silicon carbide whiskers and fibrils. Exposure of such an adhesive type, which typically exists in the form of a solid material that is transparent to microwave energy, to microwave energy would cause the adhesive to activate or to melt. An example of one such adhesive is a combination of single crystal silicon carbide whiskers and fibrils in an adhesive comprising a minor amount (about 20 wt percent, based on the weight of the organic materials) of paraffin wax, with the remainder of the organic adhesive comprising ethylene-vinyl acetate.

Polymeric materials comprising precursors that cure by cross-linking with heat also are suitable matrix materials for composite materials of the invention. These materials can be inorganic, organic, or hybrid. Such materials include polycarbosilanes (to form a silicon carbide matrix). Other suitable materials are selected from mixtures of polymer cerams. Sol-gels that form ceramic powders also may serve as a matrix material.

Thus, composite materials of the invention have many forms. For example, a liquid or paste matrix material likely yields a liquid or paste composite material of the invention. Similarly, a powder matrix material yields a powder composite material of the invention. However, such powders also may be pressed or cast into larger solid forms, such as rods, bricks, engineered parts, and the like. Resins, whether thermoset or thermoform, may be mixed with single crystal silicon carbide whiskers and fibrils, then shaped by various polymer processing methods and set or formed to yield composite material of the invention having the desired shape. Flexible composite materials of the invention may be formed from silicone or organic rubbers comprising single crystal silicon carbide whiskers and fibrils.

Similarly, objects comprising composite material of the invention are made in accordance with known methods as appropriate for the physical form of the matrix material. For example, single crystal silicon carbide whiskers and fibrils need only be mixed into a fluid, a paste, or a molten resin. Solid particulate matrix material can be mixed with or blended with single crystal silicon carbide whiskers and fibrils. Such particulate composite material of the invention then may be formed into larger solids, such as bricks, pills, rods, spheres, or any desired shape and size, by casting, pressing, or otherwise agglomerating the particulate product.

With the guidance provided herein, the skilled practitioner will be able to select a matrix material suitable for the use intended into which single crystal silicon carbide whiskers, fibrils, and blends thereof, can be introduced to form a composite material of the invention.

The proportion of single crystal silicon carbide whiskers and fibrils in the matrix material is a function of the properties and characteristics of the matrix material and the degree of heat generation desired. For example, the quantity of single crystal silicon carbide whiskers, fibrils, or blend thereof, in a thermoplastic polymer resin, especially one having a relatively low melting point, will be relatively low because care must be taken not to melt the plastic. Similarly, care must be taken to avoid setting fire to wood and cellulosic products, such as paper and cardboard. In contradistinction, ceramics are resistant to high temperatures and may be used in heat generation at high temperature. Thus, the concentration of single crystal silicon carbide whiskers, fibrils, or a blend thereof, in such a composition of the invention can be relatively high.

Thus, the lower limit of single crystal silicon carbide whiskers and fibrils in the matrix material is that level that yields the desired heat generation. Similarly, the upper limit of single crystal silicon carbide whiskers and fibrils in the matrix material is that quantity that adversely affects the properties and characteristics of the matrix material. However, this limit is higher for single crystal silicon carbide whiskers and fibrils than for known silicon carbide particulates. Known silicon carbide particulates tend to degrade the properties and characteristics of the matrix material as the concentration increases, particularly because they cause the matrix material to lose cohesive strength at high concentrations. Also, known silicon carbide particulates do not ameliorate thermal shock well. However, single crystal silicon carbide whiskers and fibrils tend to strengthen the material because the single crystal silicon carbide whiskers and fibrils are rigid rods. Further, this morphology renders the composite material of the invention highly resistant to thermal shock.

Typically, therefore, the concentration of single crystal silicon carbide whiskers and fibrils in the composite material of the invention is between about 0.1 and about 95 wt percent, based on the total weight of the single crystal silicon carbide whiskers and fibrils and matrix material. More typically, the concentration of single crystal silicon carbide whiskers and fibrils in the composite material of the invention is between about 1 and about 90 wt percent on the same basis, and even more typically is between about 5 and about 75 wt percent on the same basis. The skilled practitioner can, with the guidance provided herein, calculate or otherwise determine an appropriate concentration of single crystal silicon carbide whiskers and fibrils in a matrix material that will yield the desired heat generation in the desired application.

The skilled practitioner recognizes that various factors will affect the heating rate upon exposure of composite material of the invention. As can be seen from equation 1 above, heating rate will increase with a higher wattage. Heating rate also increases as electromagnetic radiation frequency increases. If the article to be heated is insulated, higher heating rates will result, due primarily to reduced heat transfer to the surroundings.

Both the uniformity of the energy field and the location of the object to be heated within that field also affect the heating rate. As the skilled practitioner recognizes, electromagnetic radiation fields can have irregularities in them. In particular, due to the long wavelength (10-12 cm), microwave fields have 'hot spots' and 'cold spots' that can yield different heating rates.

Both convective forces and conductive forces also affect the heating rate. Forced convection, with a fluid or gas flowing over the element to be heated, will result in lower heating rate, because forced convection lowers the temperature in the sample by transferring heat to the surrounding fluid. Conductive forces also serve to reduce heat flow when the composite material is attached to a material, such as metal, that has high thermal conductivity, as the heat readily flows through such materials, such as a metal. Thus, although there are many factors that can affect heating rate, composite material of the invention yields a marked improvement over known techniques.

Composite material of the invention has many uses. One suitable consumer use is in food processing articles. Food processing articles include, for example, bakeware, cookware, ovenable containers, mixing bowls, measuring cups, blender bowls, serving items such as plates, platters, browning platters and containers, cups, and items of this type, food heating and browning devices, and the like. An insulated vessel, as described herein, also may be used as a food processing article. Such food processing articles comprising composite material of the invention can be used to cook, bake, or otherwise process food by heating by exposing the article, or the article with food therein or thereon, to radiowave or microwave energy. Such articles include, inter alia, those described in U.S. Pat. Nos. 4,931,608; 6,608,292; 6,229,131; 7,154,073; 7,176,426; US Publication 2003/0218010; WO90/03716; WO00/35251; WO2006/068402 and EP 1,781,070.

Vessels comprising composite material of the invention are suitably used for heating or warming any object or item. For example, such a vessel is suitable for heating linseed oil or other coatings that preferably are applied warm or are heated before application. Similarly, such a vessel could be used to melt thermoplastic resins. The skilled practitioner recognizes that such vessels have a myriad of uses and, with the guidance provided herein, can make and use such vessels for any purpose.

Similarly, insulated and uninsulated vessels for heating a variety of items also can include composite material of the invention. Such vessels may be suitable for food use, or may be used for heating, and keeping warm, any object. For example, an insulated cup comprising composite material of the invention for coffee, tea, hot chocolate, or other beverages, or an insulated vessel comprising composite material of the invention, such as a bowl for foods, would both heat food and keep it warm thereafter. Also, an insulated vessel comprising composite material of the invention is useful for heating materials that require relatively high temperature, such as for melting or fusing metals. One such vessel is described in Example 9.

In one embodiment of the invention there is provided a rack suitable for use in an electromagnetically heated oven comprising support members supporting discrete, spaced apart longitudinal radiation absorbing elements comprised of single crystal silicon carbide whiskers, fibrils or a blend thereof in a matrix material, said radiation absorbing elements being supported so as to provide space between the radiation absorbing elements and the surface upon which the rack rests.

Figure 10A:
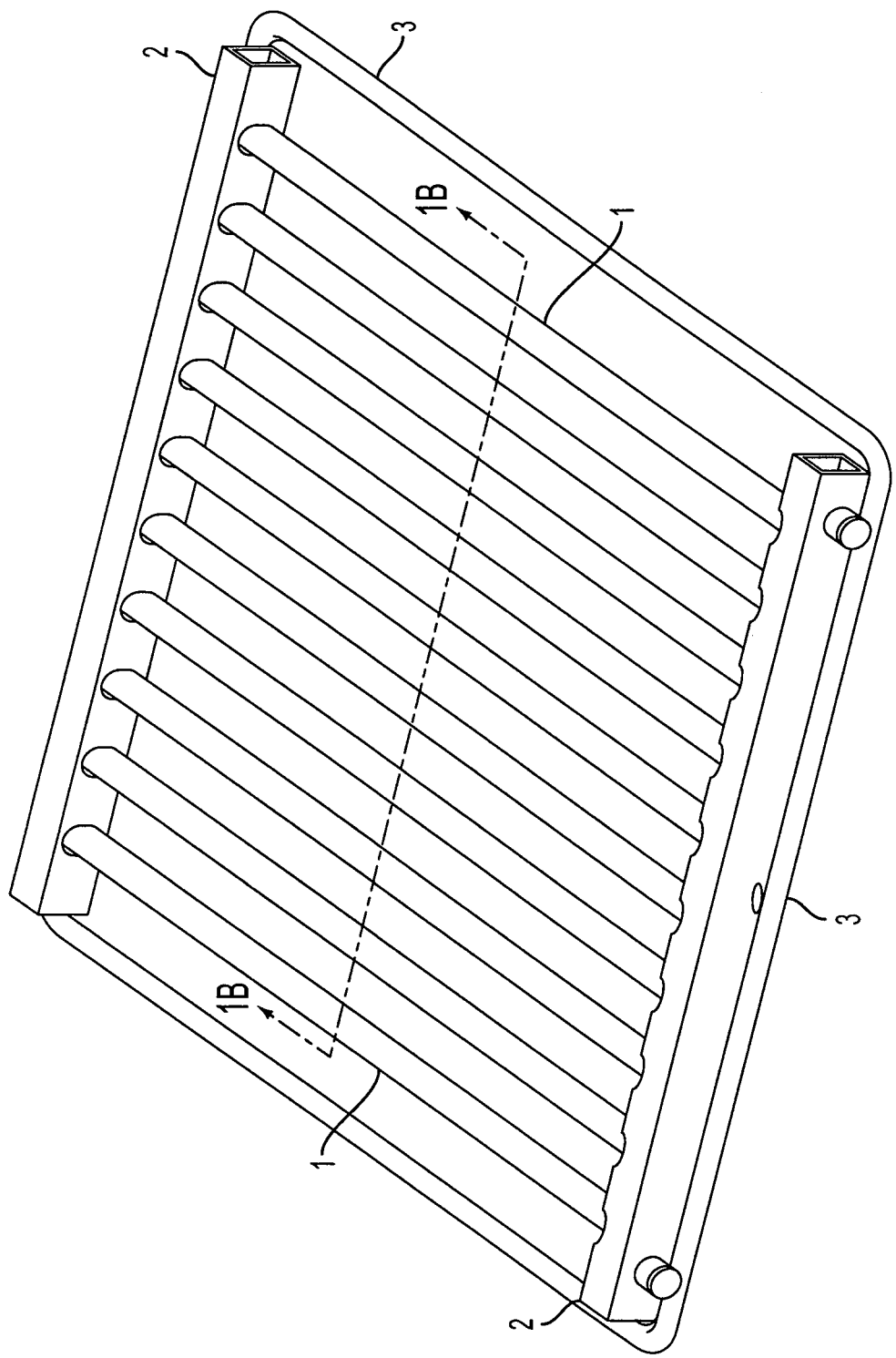
FIG. 10A is an isometric depiction of a heating rack according to one embodiment of the invention.
Figure 11A:
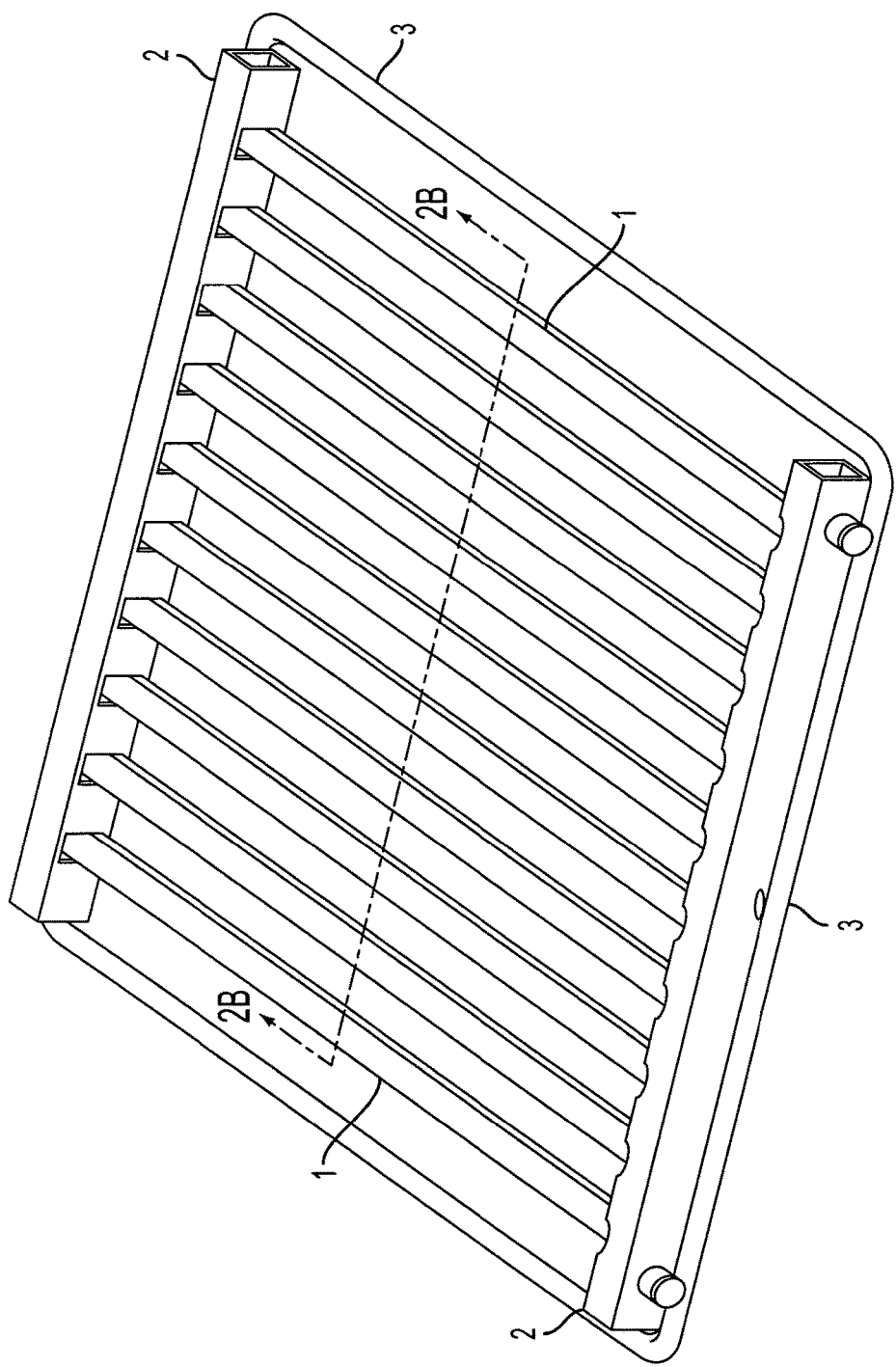
FIG. 11A is an isometric depiction of another heating rack according to the invention.
Figure 12A:
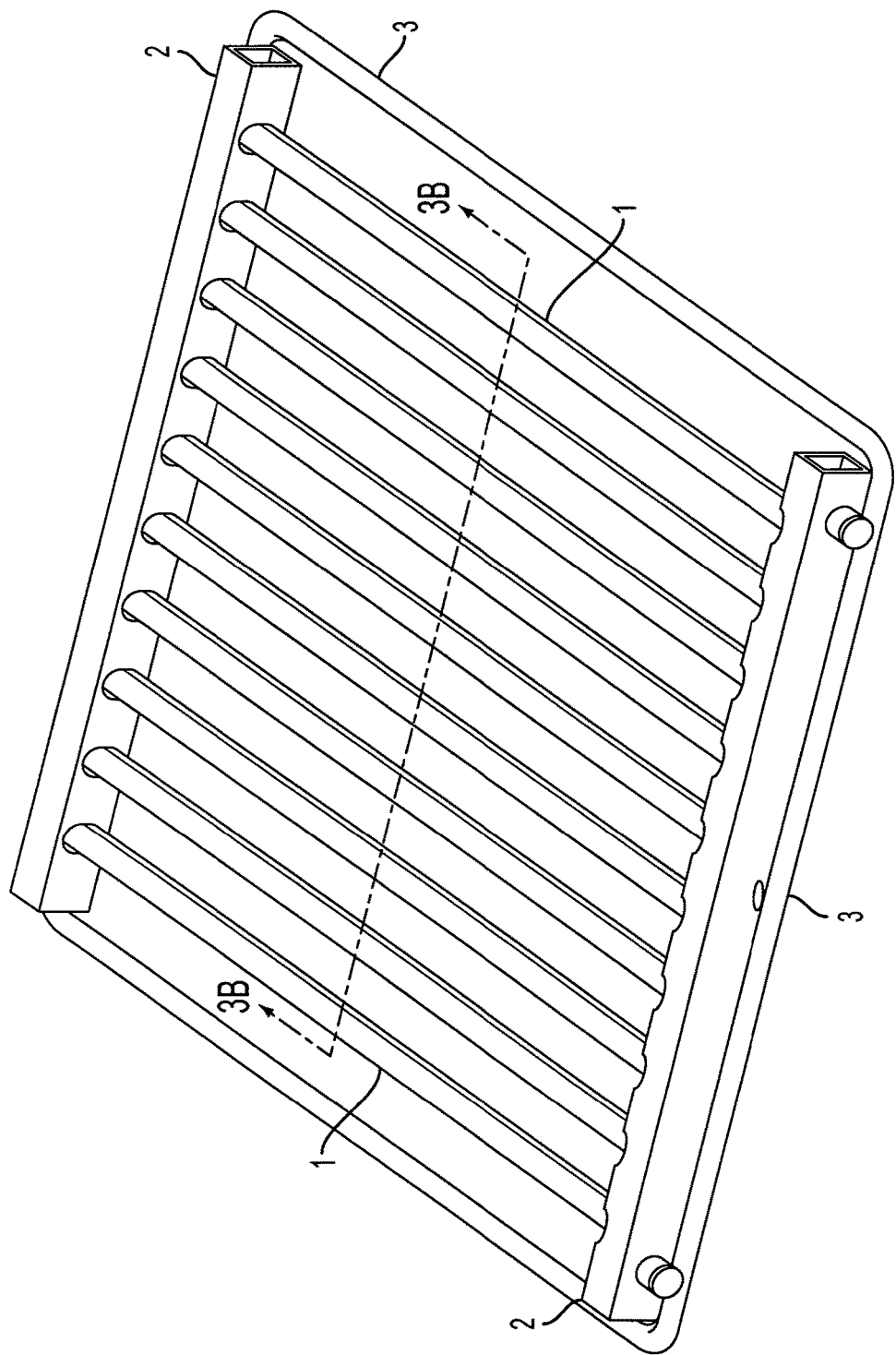
FIG. 12A is an isometric depiction of another heating rack according to the invention.

This embodiment of the invention may be better understood with reference to FIGS. 10A, 11A and 12A, exemplifications of the embodiment. Longitudinal radiation absorbing elements 1 are supported by channels 2 in a spaced-apart relationship. The channels 2, in turn, are supported from base 3 to provide space between the radiation absorbing elements and the surface upon which the rack rests. In addition, this rack and its longitudinal elements can be advantageously placed in the oven, typically above or below the food to be cooked, to achieve desired cooking effects.

The longitudinal radiation absorbing elements 1 can have a cross-section that is curvilinear, circular, (See e.g., FIG. 10B) polygonal having three or more sides (See e.g., FIG. 11B) or any custom geometries such as a t-rail design. (See e.g., FIG. 12B-D). Elements having a circular cross-section may have a diameter, for example, from about one quarter inch to 1 inch or more, having due regard for the strength needed to maintain the structural integrity of the element when in use. Elements having other cross-sections can be of comparable size. In one alternative, the elements may be hollow as shown, for example, in FIGS. 10C and 11C.

The silicon carbide and matrix materials from which the longitudinal elements may be made are those described above. A preferred combination is silicon carbide whiskers and/or fibrils in an alumina matrix. The alumina matrix may include sintering aids and toughening components such as disclosed, inter alia, in Rhodes et al., U.S. Pat. No. 4,961,757 and Rogers et al. U.S. Pat. No. 5,389,586. One typical suitable formulation contains 90.5% aluminum oxide, 0.9% yttrium oxide, 0.9% magnesium oxide and 7.7% silicon carbide whiskers. The choice of an alumina matrix provides elements which maintain their physical and mechanical integrity at operating temperatures as high as 600-800° F. or higher. That is sufficiently high to permit self-cleaning temperatures to be achieved if desired. Moreover, the finished alumina matrix elements can have a porosity of less than about 2%. They are hydrophobic, and at such low porosity, they do not absorb liquid from the food.

The longitudinal elements can be prepared employing technologies analogous to those known in the art as disclosed, inter alia, in Rhodes et al., U.S. Pat. No. 4,961,757, Rogers et al., U.S. Pat. No. 5,389,586 and Dugan et al., U.S. Pat. No. 5,398,858. For example, the silicon carbide whiskers and/or fibrils can be thoroughly dispersed throughout the matrix and the blend can be shaped and presintered by conventional methods. Elements with the alumina matrix can be axially pressed at, for example, 15-25 ksi, or extruded to produce a green product having a density of 50-75% theoretical. The green product can be sintered to produce a product having 95-100% theoretical density. Sintering temperatures of 1700° C. to 1850° C. can be employed. Extrusion provides a product in which the whiskers and/or fibrils tend to be aligned thereby adding to the toughness and fracture resistance of the product.

The longitudinal elements may be supported by any of the variety of means including channels 2 at the ends of the elements, although the supports may be located at positions other than the ends of the elements. Each element may also be individually supported. The choice of physical support means to maintain the elements in spaced-relationship above the base 3 of the rack is easily within skill of the art.

The spacing of the elements is also a matter of design choice so long as the space between elements is sufficient to, if required, allow any fluids present in food being processed to pass downwardly from the upper surface of the longitudinal element and provide sufficient support for food being processed. Because the composite material of the invention does not arc, the longitudinal elements can be abutted next to each other, allowing for maximum heat of the food via conduction (grilling), convection (in conjunction with air flow), or through infrared radiation. In addition, if desired, such spacing may, for example, be about one-eighth of an inch to about one inch or more.

The rack includes a base element 3 as shown in FIGS. 10A, 11A and 12A, which may be made of steel, ceramic, resin or the like. The function of the base is to maintain the longitudinal elements in a spaced relationship above the base of the oven. While the base is shown to be rectangular, it can also have other configurations such as circular for rotation within an oven. If desired, the space between the elements and the base of the oven, coupled with the space between elements, can be designed to allow for air flow and convection heating. Alternatively, the elements can be abutted together to provide for maximum heating via grilling and conduction. The base may also include provision for a pan member to collect fluid which exits the food during cooking. Once again the choice for a pan is easily within the skill of the art. For some applications, it may be desirable that the pan not be made of electromagnetic heat-absorbing material since its function is not to cook but to collect fluids. In other applications, it may be desirable that the pan be made of electromagnetic heat-absorbing material.

Figure 13A:
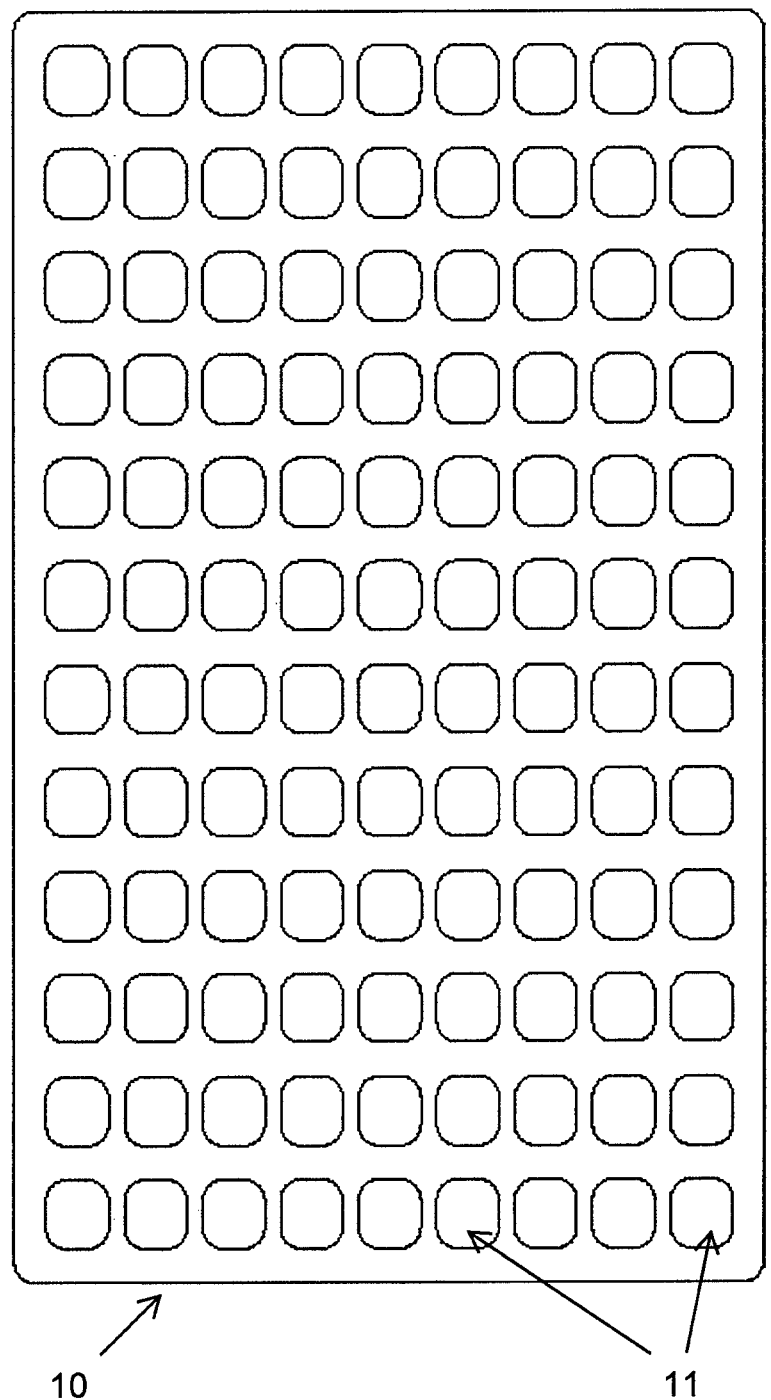
FIG. 13A is a depiction of a microwave heatable tray 10 according to the invention having a rectangle configuration and discrete microwave heatable elements 11.
Figure 13B:
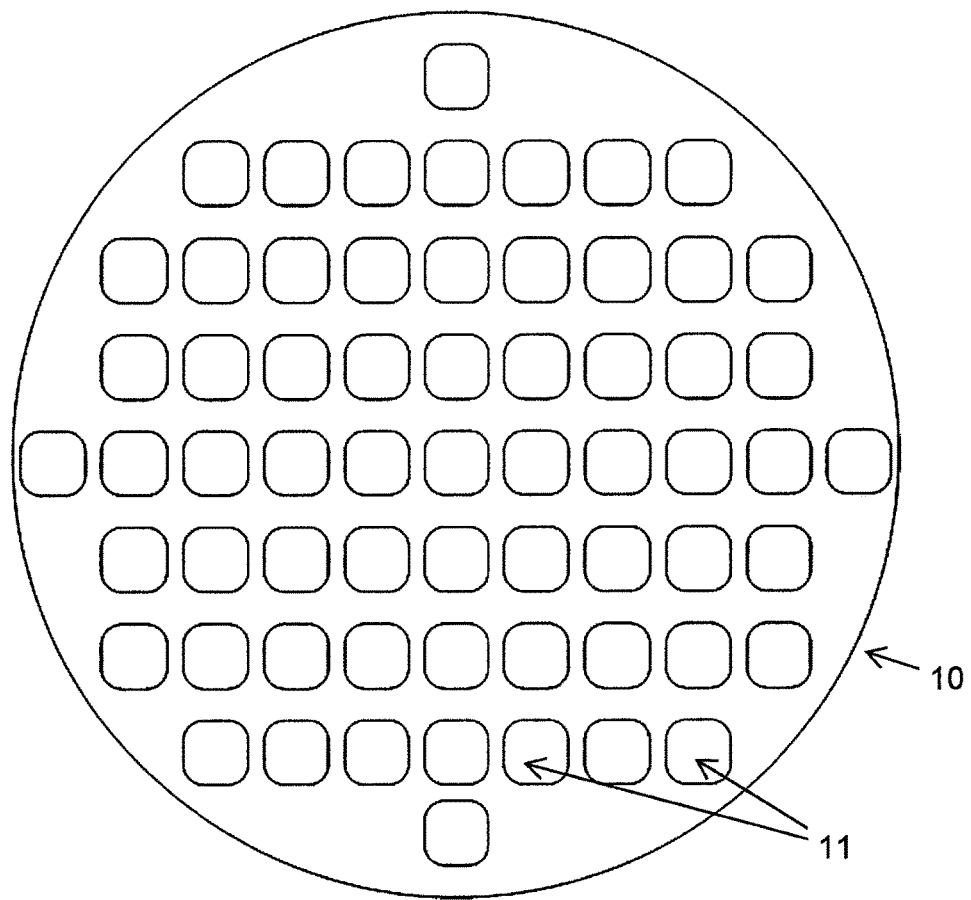
FIG. 13B is an alternative circular configuration for tray 10.

In another embodiment of the invention, as shown in FIGS. 13A and 13B, a microwave heatable tray 10 is used. A housing tray 10 is formed which holds and spaces the composite material of the invention in discrete elements 11. Preferably, this housing tray is metallic, although it can be formed of high temperature polymeric materials which are commonly used in food applications, e.g., poly (phelyene sulfide). In addition, the tray can be ceramic itself. As mentioned, a metal housing tray is preferred because it is durable and will allow for rapid heat transfer from the ceramic composite into the entire tray. This housing tray can be stamped, to enable the discrete composite ceramic to be placed in the recesses of the metal. The ceramic can be connected to the metal via brazing, high temperature adhesives, or through mechanical means. Food can be placed on the tray and can be actively cooked or baked. Various tray geometries are envisioned, including circular, square, and rectangular trays. In addition, various discrete ceramic element geometries 11 are also possible, including small tiles, rectangles and circles. The tray can be inserted or removed from the oven as desired.

It is preferred that the microwave absorbent ceramics in the tray of FIGS. 13A and B be discrete. If the ceramics on this tray are continuous, or too large, or if the entire tray is made up entirely of the composite ceramic of the invention, the tray itself can be subjected to thermal stresses that will shorten the usable life of the tray.

Composite material of the invention also is suitably used in manufacture of drying apparatus. One type of drying apparatus is used for absorbing water or another vapor or gas, particularly from the atmosphere, then desorbing that water, vapor, or gas by heating. Such drying apparatus suitable is made with a desiccant, which the skilled practitioner can select, and with composite material of the invention. The drying apparatus is used by heating the apparatus to desorb water, vapor, or gas, then allowed to cool. The cooled apparatus then is used to absorb material, which then is desorbed by heating, upon exposure to radiowaves or microwaves.

Another type of drying apparatus involves combination drying by direct microwave and the composite material of the invention. Because microwave irradiation is known to have poor field uniformity, microwave drying can be problematic. Due to non-uniform field distribution, the material to be dried may end up being well heated and dried in one area, but under-heated with undesirably high moisture content in another area, after the microwave field is applied. However, a combination dryer comprising the composite material of the invention will therefore have both direct microwave heating of the water to be driven off, in addition to convective, conductive, or infrared heating induced by the composite material of the invention. Advantageously, this combination heating and drying is performed inside a single microwave drying apparatus. The result is more uniform, complete, and efficient microwave drying than would be experienced by a microwave field alone.

Composite material of the invention also can be used in the manufacture of a combination oven. Composite material of the invention is suitably used to form the convection heating element of a combination microwave-convection oven. Such an oven thus need have only a magnetron, and not a magnetron plus an electric heating element. Rather, the microwaves are used to heat the object in the oven directly, and the microwaves also heat the composite material of the invention. The heated composite material of the invention thus serves as the convective heating element.

With the guidance provided herein, the skilled practitioner will be able to manufacture and use such food processing articles, insulated and uninsulated vessels, drying apparatus, combination ovens, and other items.

In accordance with the method of the invention, an object comprising a composite material of the invention, or a composite material of the invention itself, is heated by exposure to electromagnetic radiation, typically microwave energy. Examples 1-5 illustrate such heating. An object to be heated is placed in contact with or in close proximity with the composite material of the invention while the composite material of the invention generates internal energy in the form of heat. An example of this method is the use of the heated composite material of the invention as a heat source out of the irradiation zone, such as a heating pad or trivet for keeping food warm after the food has been cooked and before it is consumed. Heat is transmitted by, e.g., conduction, convection, or re-transmittal by infrared irradiation to the object.

Also in accordance with the method of the invention, the object to be heated can be placed in the radiation zone while the composite material of the invention is being heated. Examples 6-9 illustrate this method. Another example of this method is heating food in a microwave oven on a plate comprising composite material of the invention to heat and/or brown the food. With the guidance provided herein, the skilled practitioner will be able to practice the method of the invention.

EXAMPLES

The following examples are intended to illustrate the invention, and not to limit it in any way. For example, electromagnetic radiation of a different wavelength or power can be utilized in accordance with the invention. Similarly, the matrix materials exemplified herein are not the only matrix materials that can be used in accordance with the invention. With the guidance provided herein, the skilled practitioner will be able to practice the invention by making composite materials of the invention and use these materials in accordance with the method of the invention to heat objects quickly and efficiently, and to a temperature higher than those typically achieved by exposure to microwave energy if desired, by exposing the composite material to electromagnetic radiation, particularly to microwave energy.

In Examples 1-5, single crystal silicon carbide whiskers having an average diameter of 0.6 microns and an average length of 9 microns were used. The polycrystalline silicon carbide particulate used in comparison examples was particulate silicon carbide having an average size of less than 1 micron. The wattage value stated in an example is the nominal wattage of the magnetron used.

Example 1

Heating of a Low-Loss Dielectric Fluid

Refined mineral oil of 100% hydrocarbon (paraffin oil) content has a low dielectric loss when subjected to electromagnetic radiation, including microwave radiation. Therefore, it does not heat when exposed to microwave radiation. Single crystal silicon carbide whiskers (0.6 micron average diameter, 9 micron length) and ultrafine silicon carbide particulate (<1 micron average size) were added to separate aliquots of mineral oil at 1% by weight, and separately subjected to a microwave field of 2.45 GHz at 100 watts. The results are shown in Table 1 and illustrated in FIG. 1.

TABLE 1

| | Temperature Increase, ° C. | | |
|---|---|---|---|
| Time, seconds | Mineral Oil (1% Single Crystal Silicon Carbide) | Mineral Oil (1% Silicon Carbide Particulate) | Pure Mineral Oil |
| 5 | 3.0 | 0 | 0 |
| 10 | 8.0 | 1.0 | 0 |
| 20 | 19.7 | 2.3 | 0 |
| 30 | 32.3 | 4.7 | 2.7 |

As expected, pure mineral oil exhibits only a 2.7° C. temperature rise. Mineral oil with 1% silicon carbide particulate exhibits 4.7° C. temperature rise. Surprisingly, mineral oil with 1% by weight of single crystal silicon carbide whiskers exhibits a 32.3° C. temperature rise. The single crystal silicon carbide whiskers used in the invention were far superior to fine powder forms of silicon carbide in power dissipation, and therefore in resultant temperature increase.

Example 2

Heating of a Low-Loss Dielectric Fluid

Figure 2:
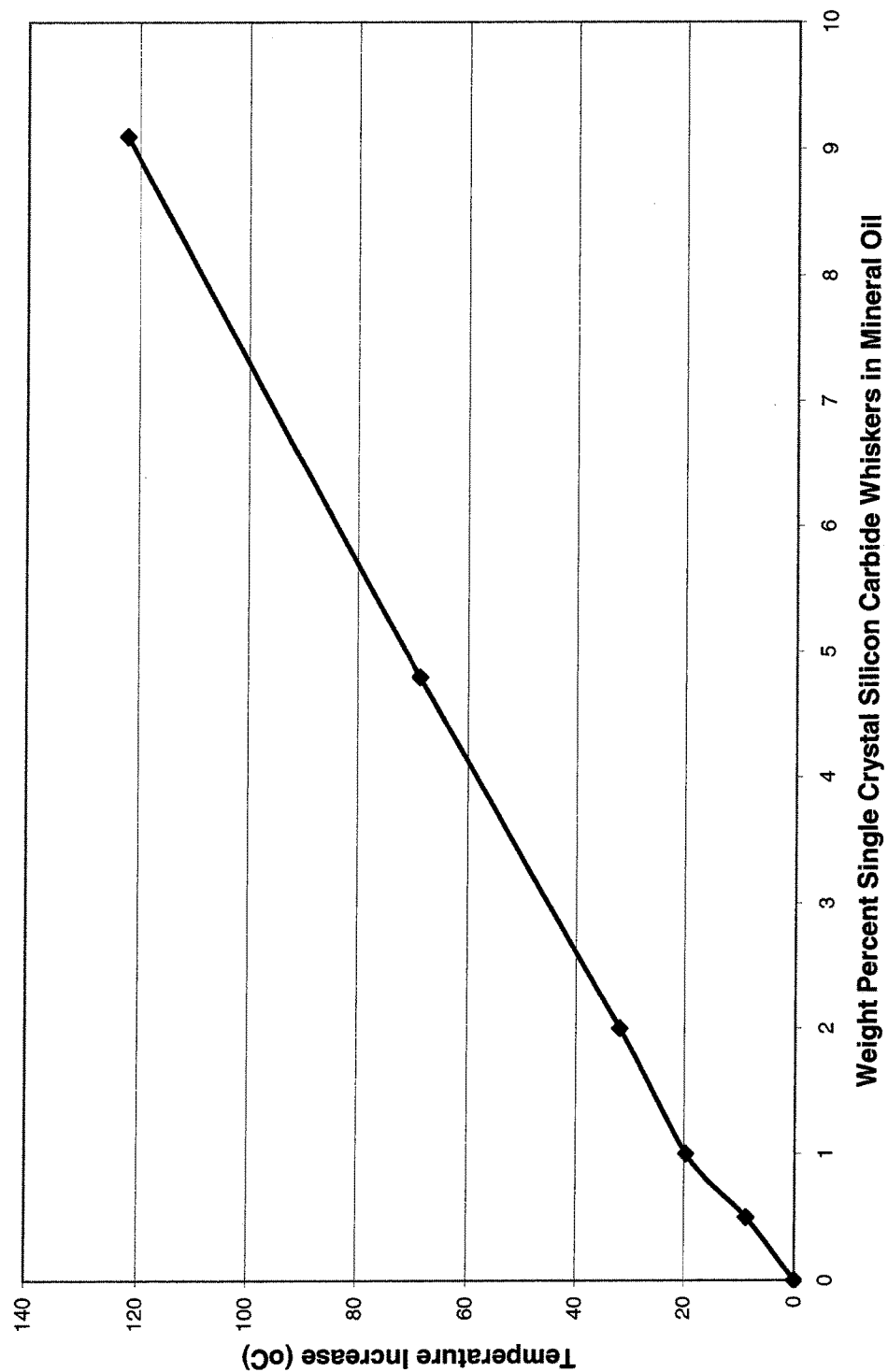
FIG. 2 illustrates the relationship between the temperature reached by a composite material of the invention and the concentration of single crystal silicon carbide whiskers in the composite material.

Single crystal silicon carbide whiskers used in the invention were again added to 100% paraffin mineral oil. In this example, the silicon carbide of the invention was added at increasing weight percentages, with the goal of increasing the dielectric loss tangent with increasing weight percent single crystal silicon carbide whiskers. Each sample was separately subjected to a microwave-energy field of 2.45 GHz at 1000 watts for 20 seconds. The temperature rise is shown in Table 2 below, and is illustrated in FIG. 2:

TABLE 2

| Wt percent Single Crystal Silicon Carbide Whiskers In Mineral Oil | Temperature Increase, ° C. |
|---|---|
| 0 | 0 |
| 0.5 | 8.7 |
| 1.0 | 19.7 |
| 2.0 | 32.0 |
| 4.8 | 68.7 |
| 9.1 | 122.3 |

As can be clearly seen from this data, increasing the concentration of single crystal silicon carbide whiskers accelerated the temperature increase. Thus, the dielectric loss tangent increased with increasing single crystal silicon carbide whisker concentration.

Example 3

Heating of a Low Dielectric Solid

Figure 3:
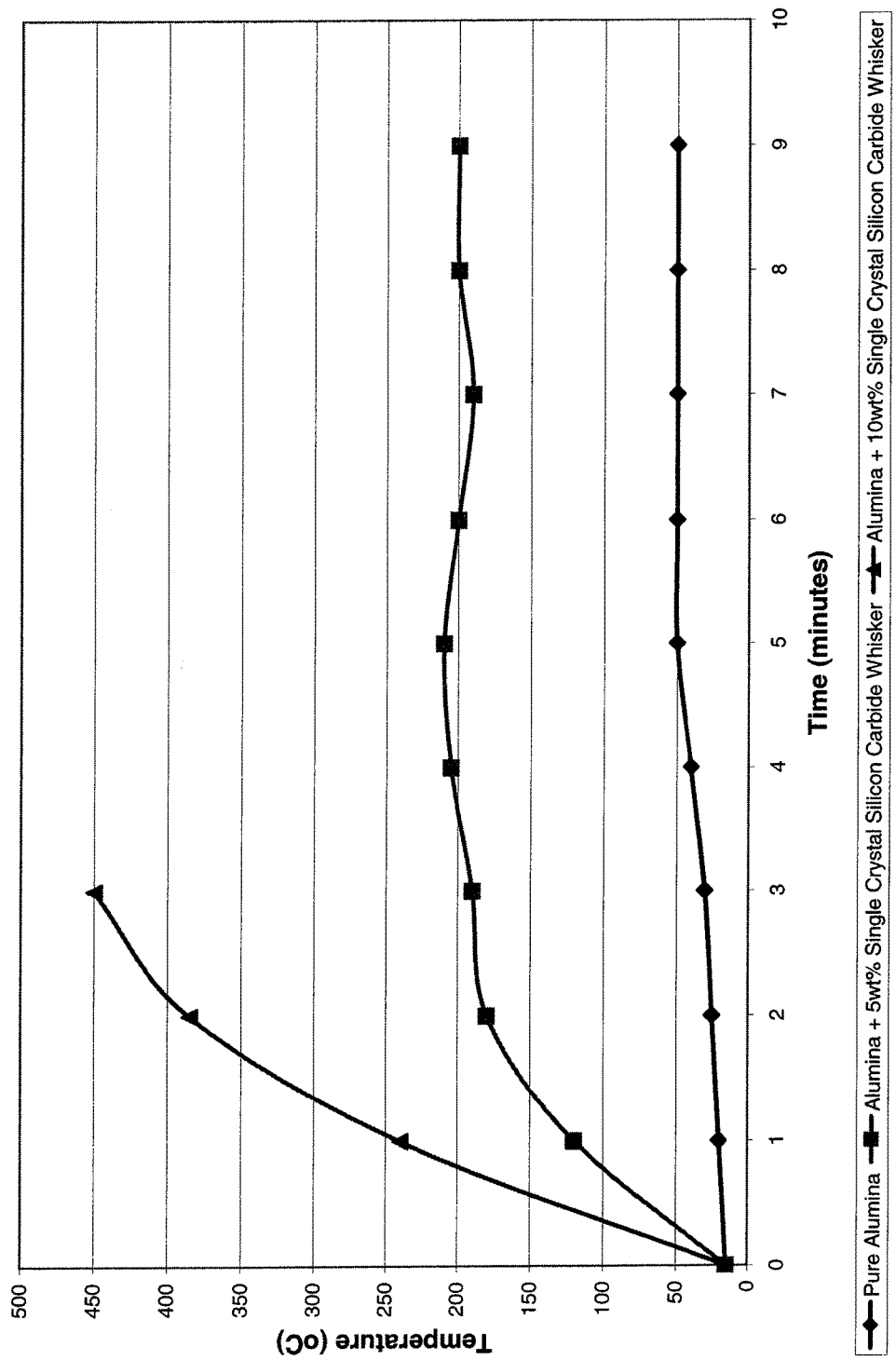
FIG. 3 illustrates a comparison of microwave heating of alumina-based materials.

Alumina is a ceramic material that has a very low dielectric loss tangent in the RF and microwave spectra. Therefore, it does not efficiently convert this energy into heat. Ceramic composites (composite material of the invention) were made by combining alumina with the single crystal silicon carbide whiskers of Example 1. These composites were then hot-pressed into a ceramic composite material of the invention. This ceramic composite was subjected to a microwave field of 2.45 GHz at 1000 watts. The temperature of the ceramic was recorded with time. Results are shown in FIG. 3.

As can be clearly seen, single crystal silicon carbide whiskers formed composite materials of the invention with alumina and heated rapidly compared with the microwave-transparent matrix material (alumina), and the rate of temperature increase was made larger by a greater proportion, measured as wt percent, of single crystal silicon carbide whiskers in the composite material of the invention.

Example 4

Measurement of Dielectric Properties of Porous Powders

Single crystal silicon carbide whiskers of Example 1 were again added to alumina, a low dielectric loss solid. In this example, the single crystal silicon carbide whiskers were added at increasing weight percentages, with the goal of making composite materials of the invention with increasing dielectric loss tangent concurrent with increasing concentration of single crystal silicon carbide whiskers. The dielectric loss tangents of the blended, porous powders were measured. Metal probes were placed into the powders, and then the porous powders were subjected to a frequency network analyzer at 915 MHz. The network analyzer determined the relative dielectric constant and the loss tangents of these powders.

Four powders were tested:
(1) Pure alumina, with 0% by weight single crystal silicon carbide whiskers;
(2) Alumina with 7.5% by weight single crystal silicon carbide whiskers;
(3) Alumina with 15% by weight single crystal silicon carbide whiskers; and
(4) Alumina with 25% by weight single crystal silicon carbide whiskers.

Figure 4:
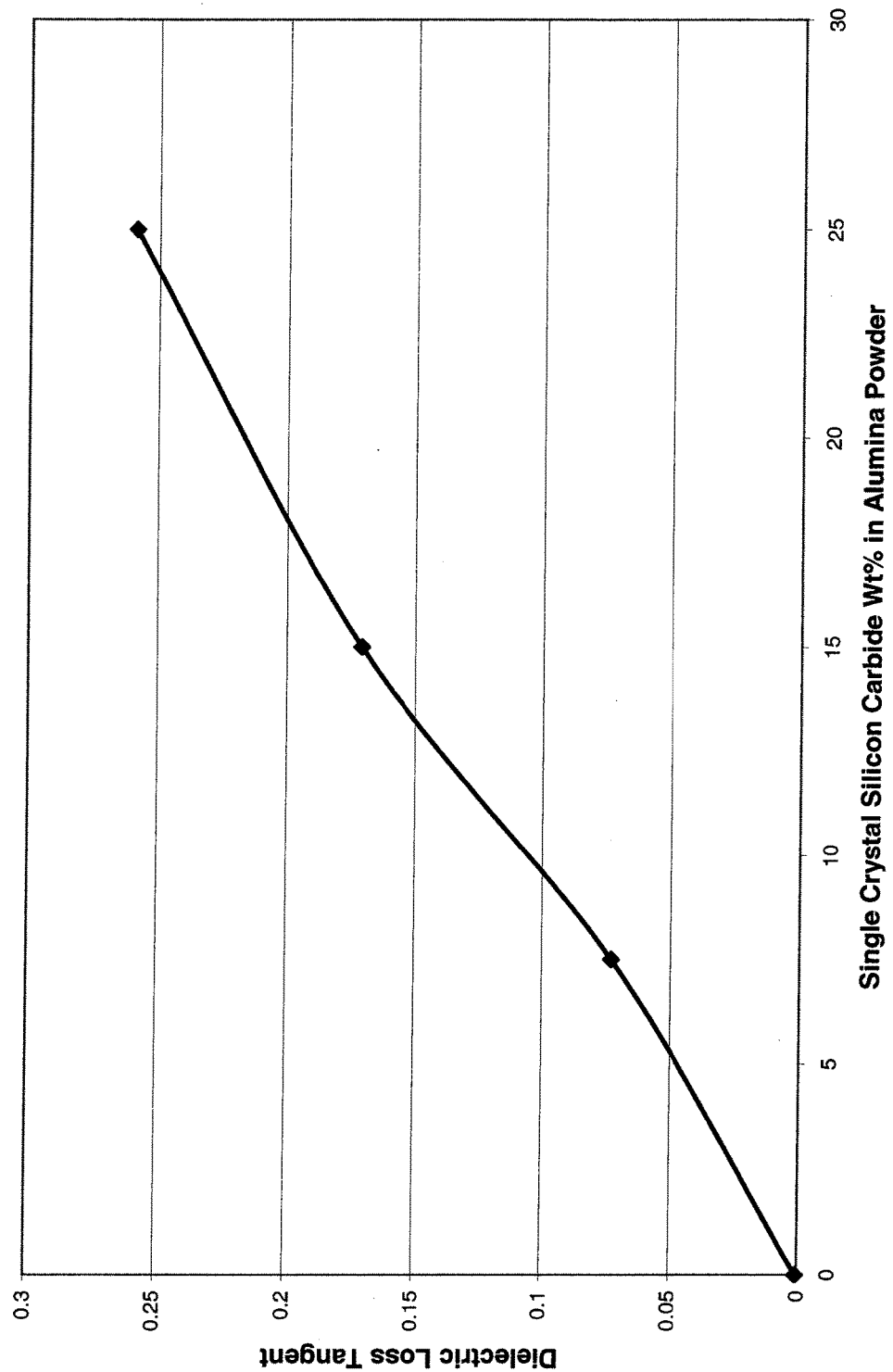
FIG. 4 illustrates the dielectric loss tangent as a function of the single crystal silicon carbide whiskers in an alumina matrix.

The resultant dielectric loss tangents are summarized in Table 3 below and are illustrated graphically in FIG. 4:

TABLE 3

| Wt percent single crystal silicon carbide whiskers in alumina | Dielectric loss tangent |
|---|---|
| 0 | 0.0007 |
| 7.5 | 0.073 |
| 15 | 0.171 |
| 25 | 0.259 |

This test showed that pure alumina has a very low loss tangent. Its ability to convert the applied 915 MHz field into heat was very small. The effect of the single crystal silicon carbide whiskers in the composite materials of the invention was clear: the loss tangent increased from 0.0007 for pure alumina up to 0.259 for composite material of the invention comprising alumina powder containing 25% single crystal silicon carbide whiskers. The silicon carbide single crystal dramatically increased the loss tangent by a factor of about 37,000%.

Example 5

Comparison of Single Crystal Silicon Carbide Whiskers Used to Make Composite Material of the Invention to Other Forms of Silicon Carbide The ability to increase temperature upon exposure to microwave energy is a direct reflection of the dielectric loss tangent of the composition when all other variables are kept constant. The ability of fine polycrystalline silicon carbide particulate to increase temperature upon exposure to microwave energy was compared to the ability of single crystal silicon carbide whiskers as used in Example 1 and to single crystal silicon carbide fibrils to increase temperature under the same conditions. These single crystal silicon carbide fibrils were the same diameter as the single crystal silicon carbide whiskers of Example 1, but were approximately 20 microns in length, as compared with the 9 micron length of the single crystal silicon carbide whiskers of Example 1.

The identity and manufacturer of each particulate silicon carbide is identified in Table 5 below. To compare the materials, 100 grams of each material was separately placed into an alumina crucible and then separately subjected to a 2.45 GHz microwave field at 1000 watts.

Figure 5:
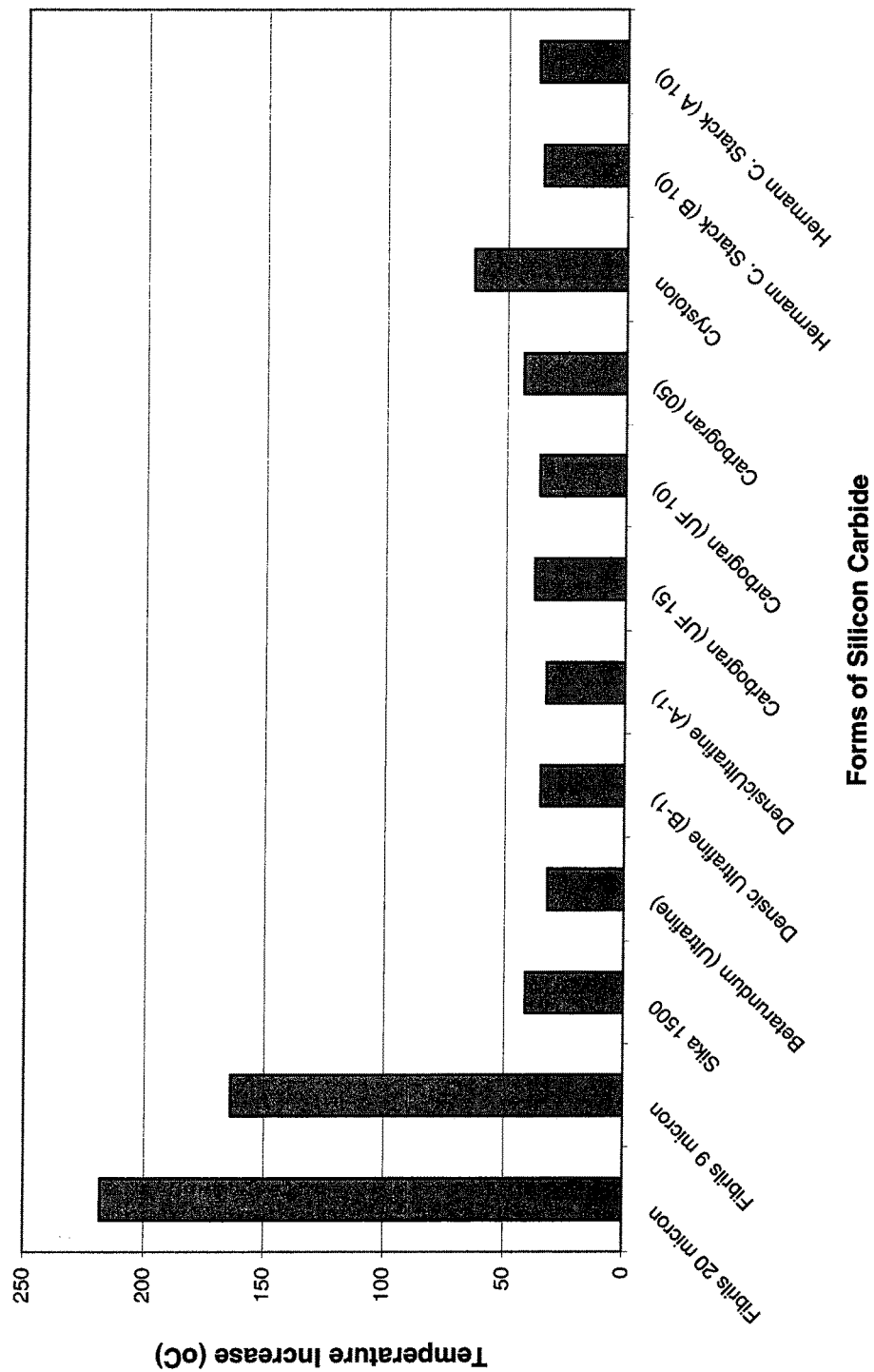
FIG. 5 illustrates a comparison of the heating ability of commercially-available silicon carbide as compared with single crystal silicon carbide whiskers.

The temperature rise of each material then was determined. Table 4 summarizes and FIG. 5 illustrates the result.

Surprisingly, and in accordance with the invention, the single crystal silicon carbide whiskers demonstrate much higher conversion of microwave radiation into heat. In addition, the longer crystal size of the single crystal silicon carbide whiskers used in the invention provided more efficient conversion of microwave energy to heat.

TABLE 4

| Silicon Carbide Source | Temperature Incr., ° C. |
|---|---|
| Single crystal silicon carbide fibrils, 20 micron crystal | 218 |
| Single crystal silicon carbide whiskers, 9 micron crystal | 164 |
| Sika 1500 (Saint Gobain, Lillesand, Norway) | 41 |
| Betarundum (Ultrafine) (Ibiden Company, Japan) | 32 |
| Densic Ultrafine (B-1) (Showa Denko, Japan) | 35 |
| DensicUltrafine (A-1) (Showa Denko, Japan) | 33 |
| Carbogran (UF 15) (Lonza Inc, Fairlawn, NJ) | 38 |
| Carbogran (UF 10) (Lonza Inc., Fairlawn, NJ) | 36 |
| Carbogran (05) (Lonza Inc., Fairlawn, NJ) | 43 |
| Crystolon (Norton, Worcester, MA) | 64 |
| Hermann C. Starck (B 10) (Hermann Starck, Newton, MA) | 35 |
| Hermann C. Starck (A 10) (Hermann Starck, Newton, MA) | 37 |

In Examples 6-8, single crystal silicon carbide whiskers having an average diameter of 0.6 microns and an average length of 10 microns were blended with alumina powder to form a composite material of the invention. A mass of each composite material of the invention shown in tables below was heated in a single magnetron microwave oven at a frequency of 2.45 GHz and power of about 1000 watts.

Each powder was heated five times; the average of the tests is shown in the tables. Each heating period lasted 600 seconds, or until the temperature reached 1300° C. There were some differences in heating rate for each trial with a specific mass. Whereas the average data in the tables may not exceed 1300° C., each trial of the 15 and 25 wt percent single crystal silicon carbide whiskers samples attained a temperature of at least 1300° C.

Those skilled in the art know that one challenge in microwave heating is field non-uniformity, as described above. Typical microwave wavelengths vary from 10 cm to 12 cm in length. Thus, these wavelengths are long, and can result in a non-uniform field. A specimen may experience high flux rates of radiation in 1-2 cm zone. However, outside this hot zone by a distance as small as 1-2 cm, the flux rate can be significantly lower. Therefore, uneven heat rates experienced in these Examples is believed to have been caused by non-uniform field distribution.

Various techniques can be utilized to improve field uniformity. Techniques include: (1) using multiple magnetrons to inject microwave radiation into the chamber at different locations, (2) waveguides and wave-splitting devices to control microwave directionality, (3) metal reflectors, fans, and "stirrers" to disperse the microwave radiation, and (4) turntables or other devices to move the specimen in the field, thereby distributing the flux over the specimen.

Use of these techniques generally improves the uniformity of heating rates. However, the oven used in the experiments was a single magnetron system, and therefore had distinct field non-uniformity. Therefore, certain precautions were taken to improve accuracy and reliability of the results of this single magnetron system. Prior to conducting heating rate tests, the distribution of the microwave field was mapped. So-called "hot spots" and "cold spots" were identified. Specimens for measurement then were placed directly in the areas of high energy flux, i.e., the "hot spots." For the most part, this approach delivers repeatable results. However, if the specimen was placed slightly off location, or if the specimen itself distorts the energy field, then relatively minor changes in heating rates will have been experienced.

Therefore, to ensure the data is high-quality and repeatable, the heating rate tests were repeated five times. In some cases, slower heating rates were observed. Although the inventors do not wish to be bound by theory, it is believed that these differences in heating rates were due to reasons mentioned. Nevertheless, the average heating rates clearly demonstrated the utility of the invention. In addition, this approach clearly demonstrated the utility of the invention in 'real world' applications where field non-uniformity is a reality.

Example 6

Heating Rate of Composite Material of the Invention in a Crucible

The crucible used to contain the composite material of the invention had a diameter of 38.1 mm and a height of 89.2 mm. The composite materials of the invention were blended powders of alumina and single crystal silicon carbide whiskers comprising 25, 15, and 7.5 wt percent single crystal silicon carbide whiskers. The powder charges to the crucible had average weights of 74.8 grams, 79.5 grams, and 72.2 grams, respectively. The composite materials of the invention occupied 76.0 vol percent, 91.1 vol percent, and 91.9 vol percent of the volume of the crucible, respectively, for the 25 wt percent, 15 wt percent, and 7.5 wt percent composite materials of the invention.

Figure 6:
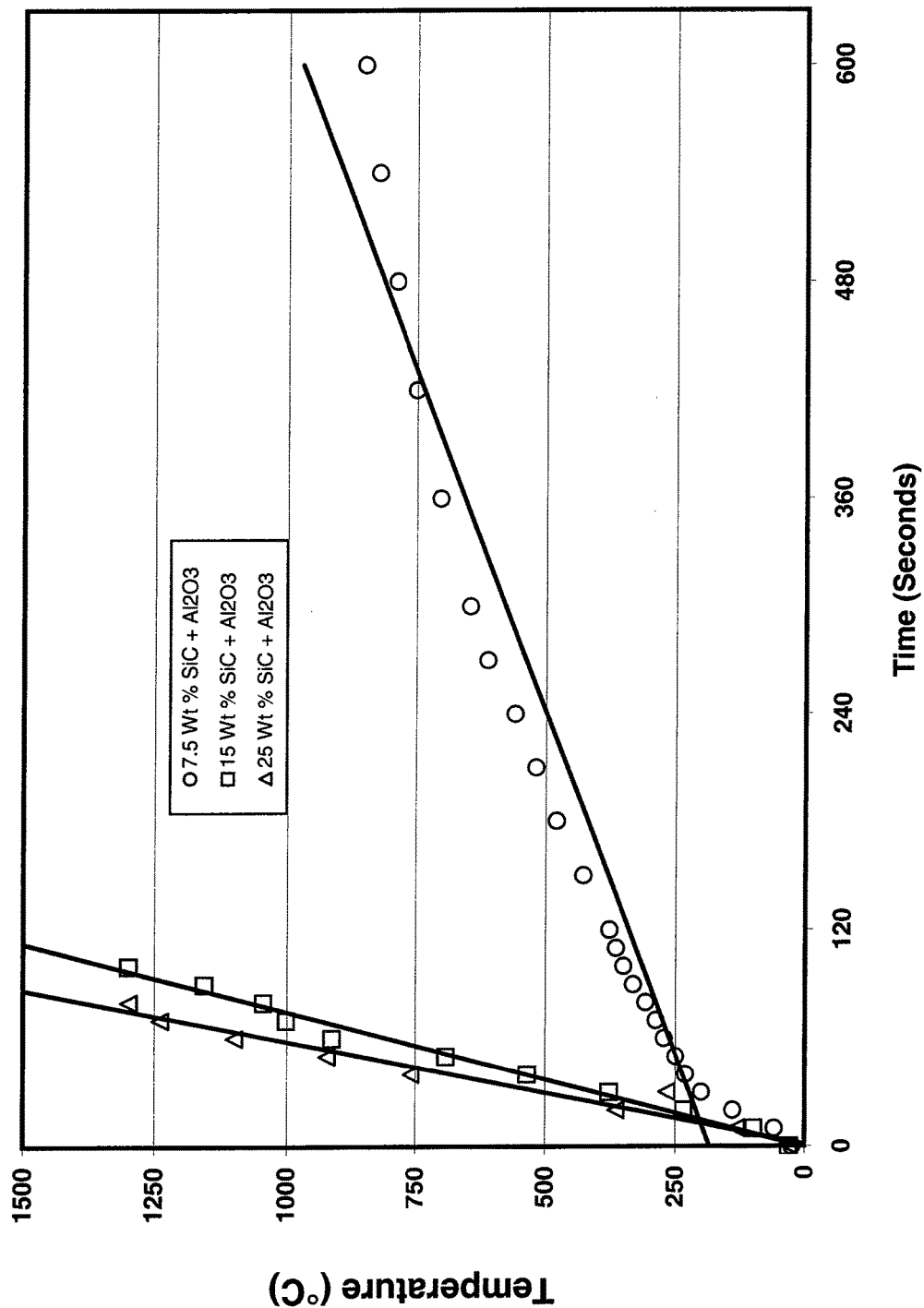
FIG. 6 depicts the average heating rate for composite material of the invention comprising single crystal silicon carbide whiskers with alumina.

FIG. 6 depicts the average heating rate for each sample. Each composite material of the invention comprised single crystal silicon carbide whiskers with alumina. As can be seen, the composite material of the invention comprising 25 wt percent single crystal silicon carbide whiskers heated most quickly. Also, both the 15 and 7.5 wt percent composite material of the invention heated to temperatures well above temperatures typically achieved with polycrystalline silicon carbide particulate as the microwave receptor.

Example 7

Comparative Example

Figure 7:
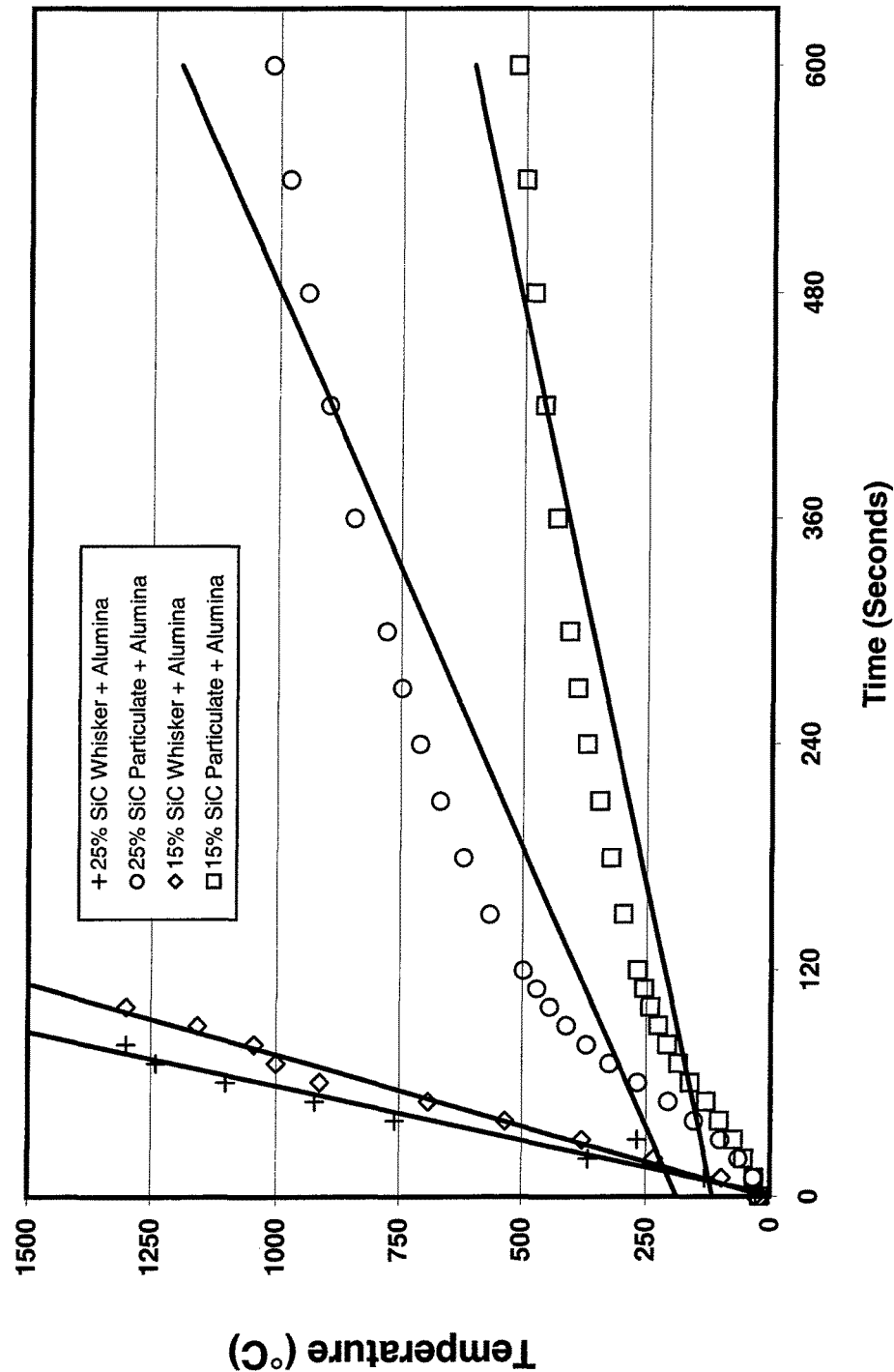
FIG. 7 depicts the heating ability of composite material of the invention compared to comparative samples prepared with polycrystalline silicon carbide particles.

The heating ability of composite material of the invention comprising 15 and 25 wt percent single crystal silicon carbide whiskers of Example 6 were compared to comparative samples prepared with polycrystalline silicon carbide particles having an average particle size of less than 1 micron with alumina. Loose powder was heated for 600 seconds in the same crucible used in Example 6. The average weight and volume percentage of the crucible occupied by the 25 wt percent and 15 weight percent samples were 92.4 grams, 77.5 vol percent, and 93.5 grams, 77.4 vol percent, respectively. As can be seen in FIG. 7, the 25 percent polycrystalline silicon carbide heated to 1016° C. in 600 seconds, but the lower concentration did not reach this temperature.

From this information, it can be seen that composite material of the invention comprising single crystal silicon carbide whiskers heated much more quickly, and to a higher temperature, than the same matrix material (alumina) blended with polycrystalline silicon carbide particles.

Example 8

Rods Comprising Composite Material of the Invention

Composite material of the invention comprising 7.5 and 15 wt percent single crystal silicon carbide whiskers, with the remainder alumina, were extruded into a rod shape, then sintered into a fused ceramic rod. The characteristic dimensions and weights of the rods are shown in Table 5.

Figure 8:
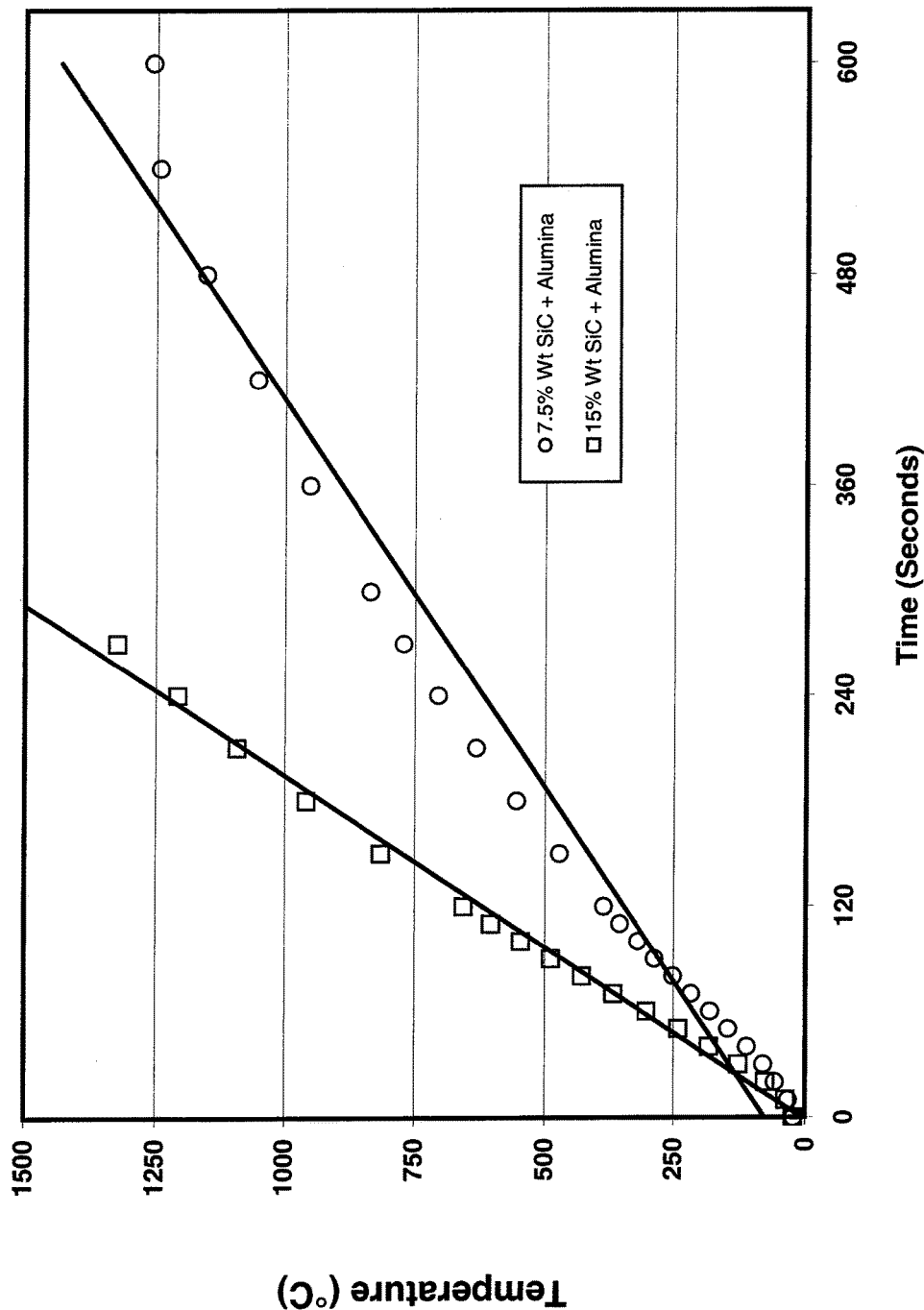
FIG. 8 depicts the average heating rate for composite material of the invention in the form of a sintered, fused ceramic rod.

Four rods were heated at the same time in the crucible of Example 6 and in accordance with the method of Example 6. Five trials were carried out, with the average depicted in FIG. 8.

TABLE 5

| | Percentage single crystal silicon carbide whiskers | |
|---|---|---|
| | 7.5 | 15 |
| Rod diameter, cm | 1.42 | 1.45 |
| Rod length, cm | 10.3 | 6.9 |
| Rod weight, grams | 60.4 | 42.5 |

As expected, the rods having the greater concentration of single crystal silicon carbide whiskers heated more quickly. However, comparison with the same tests carried out in a crucible on loose powder having the same concentrations of single crystal silicon carbide whiskers in Example 6 indicated that rod heats faster at 7.5 wt percent single crystal silicon carbide whiskers, but the powder heated faster at 15 wt percent single crystal silicon carbide whiskers. The skilled practitioner recognizes that the rods, which are less porous than the powder blend, should heat more quickly than loose powder having the same single crystal silicon carbide whiskers and fibrils concentration. In these trials, the thermocouple used to measure the temperature was not connected directly to the rods because this caused sparking. Although the inventors do not wish to be bound by theory, it is believed that this arrangement resulted in differences between temperature measurement for the rods and the powder. In any event, the data showed that composite material of the invention in rod form heats quickly, efficiently, and to high temperature.

Example 9

A ceramic mixture was produced by blending 7.5% silicon carbide whiskers with high purity alumina (>99.9% alumina by weight). Sintering aids of magnesia and yttria were also added at levels up to 5 volume percent. The mixture was milled until a uniform dispersion of silicon carbide whisker in the ceramic blend was attained.

This ceramic mixture was then compounded into a paste to enable further processing via extrusion. To produce the paste, the ceramic powders were mixed with water, mineral oil, and carboxymethyl cellulose. The resultant paste was 88% solids by weight. Other water-soluble polymers can be used, including linear, branched, and crosslinked polymers, and well as cationic, anionic and nonionic versions, can be used. These water-soluble polymers include hydroxyethyl cellulose, carageenan, xanthan gum, poly-acrylates, poly vinyl alcohols, and poly acrylamides, to name a few.

Once a paste was formed, the mixture was extruded through a die to form linear rods. These rods were cut to a desired length of 13 inches. These rods were then dried, and placed in a dewax oven at 500° C. to burn out the binder and remove all residual organics. After drying and dewaxing, the product had a green density of 63% of theoretical. The product was sintered at 1600° C. for 24 hours in a nitrogen atmosphere. The product was cool slowly to room temperature and removed from the sinter kiln, resulting in microwave absorbent rod. The finished rod density was >96% of theoretical.

A rack with supporting members was fabricated from stainless steel similar to the rack as shown in FIG. 10A. A unitary piece of stainless steel was used to avoid arcing by the frame itself. The microwave absorbent rods were placed in this rack, and the rods were locked into place. The final result was a microwave absorbent and heatable rack with the frame made out of stainless steel and the microwave heatable elements from the ceramics as manufactured above.

Example 10

Melting Aluminum Powder

A blend of 75 wt percent alumina and 25 wt percent single crystal silicon carbide whiskers having an average diameter of 0.6 microns and an average length of 9 microns was prepared to form composite material of the invention. This composite material of the invention was placed in the void between two zirconia crucibles of different diameter and height. Metallic aluminum was placed in the smaller crucible, and the entire mass was heated in a microwave oven at a frequency of 2.45 GHz and power of about 1000 watts.

The larger zirconia crucible had a diameter of 69.3 mm and a height of 105.3 mm. The smaller crucible had a diameter of 38.1 mm and a height of 82.6 mm. A quantity of 75.1 grams of the composite material of the invention in powder form was placed in the larger crucible, and the small crucible nested inside the larger crucible. The smaller crucible was pushed down into the powder composite material of the invention so that the composite material of the invention came up the sides the smaller crucible.

Figure 9:
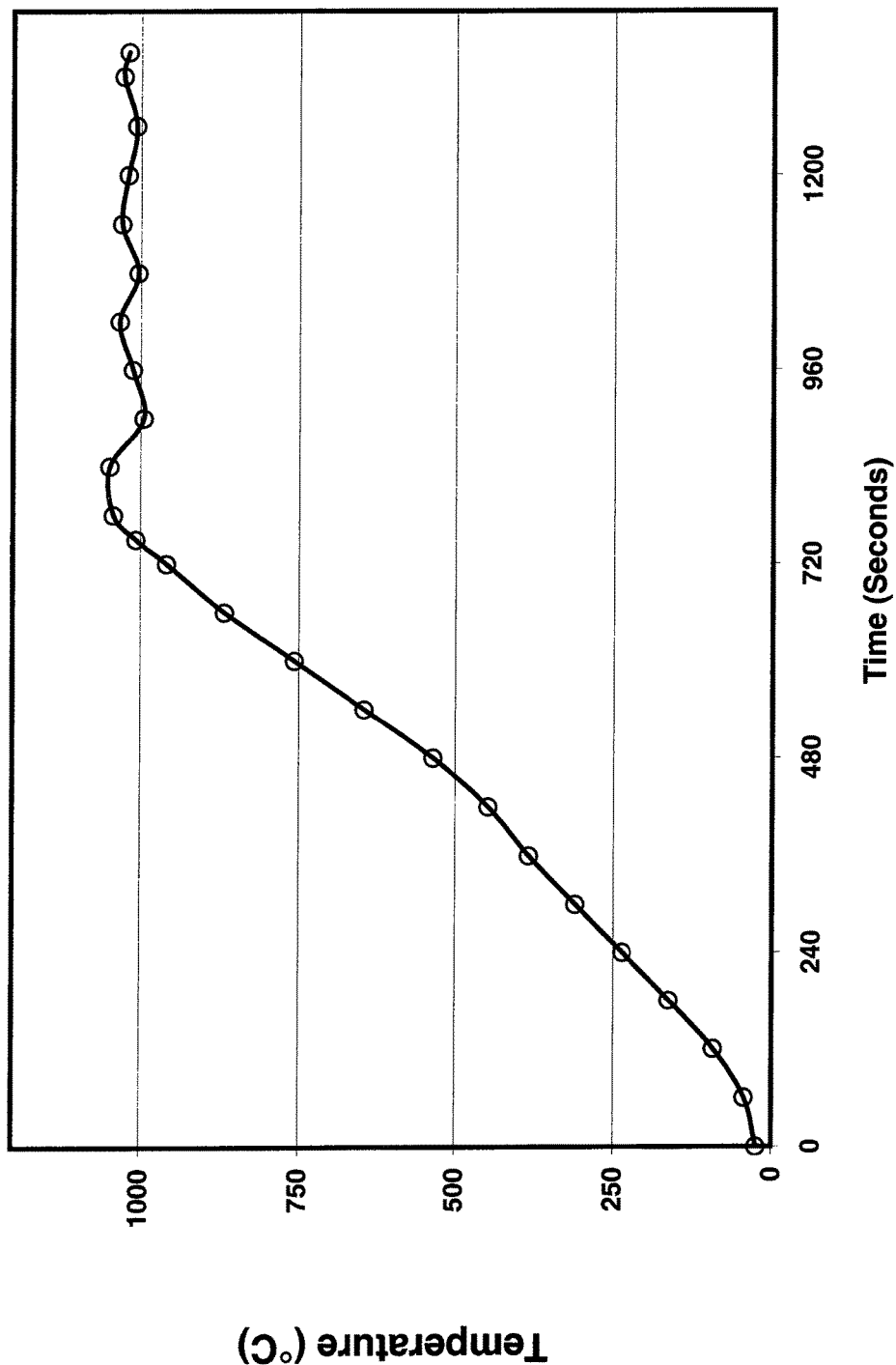
FIG. 9 depicts the heating rate of aluminum powder that was melted and fused into a solid mass by heating with composite of the invention.

Five grams of metallic aluminum were placed inside the smaller crucible, which was itself surrounded by the powder composite material of the invention. The apparatus was insulated with one inch thick, high-temperature fibrous alumina-silicate insulation, and the entire mass was heated, with the objective of maintaining a metal temperature of 1000-1050° C. to effect melting of the aluminum. As can be seen in FIG. 9, the temperature reached 1007° C. after 750 seconds. Thereafter, the temperature was maintained essentially within the range of 1000-1050° C. thereafter.

As the aluminum metal melted, a solid/liquid equilibrium formed. At the end of the heating period, the entire system was cooled to room temperature. The aluminum had formed a solid mass, thus showing that composite material of the invention can be used to heat, soften, anneal, and melt metals.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A microwave absorbing and heatable food processing article comprising composite material that increases in temperature upon exposure to electromagnetic radiation, said composite material comprising single crystal silicon carbide whiskers, fibrils, or a blend thereof, in a matrix material that is substantially transparent to electromagnetic radiation, wherein the composite material has a dielectric loss tangent which is at least 100 times greater than that of the matrix material.

2. The article of claim 1 wherein the composite material comprises single crystal silicon carbide whiskers having a diameter between about 0.2 and about 10 microns and an aspect ratio of between about 10 and 25.

3. The article of claim 1 wherein the composite material comprises silicon carbide fibrils having a diameter between about 4 and about 20 microns and a length of at least about 50 microns.

4. The article of claim 1 wherein the single crystal silicon carbide whiskers and fibrils further comprise a dopant.

5. The article of claim 4 wherein the dopant is nitrogen.

6. The article of claim 1 wherein the article browns food contained therein when the article is exposed to microwave radiation.

7. The article of claim 1 wherein the matrix material comprises a polymer.

8. The article of claim 1 wherein the matrix material comprises a polymeric film.

9. The article of claim 1 wherein the matrix material comprises a fluorocarbon polymer.

10. The article of claim 1 wherein the matrix material comprises a thermoplastic polymer.

11. The article of claim 1 wherein the matrix material comprises a crosslinked (thermoset) polymer.

\* \* \* \* \*